US006669804B2

(12) United States Patent
Pendry et al.

(10) Patent No.: US 6,669,804 B2
(45) Date of Patent: Dec. 30, 2003

(54) LABEL HAVING TAB MEMBER AND METHODS FOR FORMING, APPLYING AND USING THE SAME

(75) Inventors: Roger L. Pendry, Bartlett, IL (US); Carl W. Treleaven, Greensboro, NC (US)

(73) Assignee: Pharmagraphics (Southeast) L.L.C., Greensboro, NC (US)

(*) Notice: Subject to any disclaimer, the term of this patent is extended or adjusted under 35 U.S.C. 154(b) by 278 days.

(21) Appl. No.: 09/976,550

(22) Filed: Oct. 12, 2001

(65) Prior Publication Data

US 2002/0015813 A1 Feb. 7, 2002

Related U.S. Application Data

(62) Division of application No. 09/232,553, filed on Jan. 18, 1999, now Pat. No. 6,329,034.

(51) Int. Cl.[7] .......................... B32B 31/18; B32B 31/10; B32B 31/04; G09F 3/02; B42D 15/00

(52) U.S. Cl. ........................ 156/252; 156/267; 156/270; 156/300; 156/302; 156/230; 428/40.1; 428/43; 428/77; 428/124; 428/192; 428/914; 40/306; 40/310; 40/625; 283/51; 283/81; 283/100; 283/105; 283/106

(58) Field of Search ................................ 156/230, 227, 156/267, 269, 270, 277, 301, 302, 516, 527, 250, 252, 553, 268, 299, 300, 290; 428/40.1, 43, 77, 124, 125, 130, 192, 126, 202, 203, 914; 281/1, 2, 5; 40/306, 310, 312, 625; 283/51, 60.1, 61, 81, 100, 105, 106

(56) References Cited

U.S. PATENT DOCUMENTS

| | | | | | |
|---|---|---|---|---|---|
| 2,902,734 | A | | 9/1959 | Walters | 24/7 |
| 4,592,572 | A | | 6/1986 | Instance | 281/2 |
| 4,621,837 | A | | 11/1986 | Mack | 283/105 |
| 4,933,043 | A | * | 6/1990 | Instance | 156/248 |
| 5,074,595 | A | | 12/1991 | Hill et al. | 283/91 |
| 5,207,746 | A | | 5/1993 | Jones | 283/81 |
| 5,234,735 | A | | 8/1993 | Baker et al. | 428/40 |
| 5,262,214 | A | | 11/1993 | Instance | 428/40 |
| 5,263,743 | A | | 11/1993 | Jones | 283/81 |
| 5,308,119 | A | | 5/1994 | Roshkoff | 283/58 |
| 5,403,636 | A | * | 4/1995 | Crum | 428/41.8 |
| 5,435,600 | A | | 7/1995 | Griffiths et al. | 283/81 |
| 5,439,721 | A | | 8/1995 | Pedroli et al. | 428/40 |
| 5,489,123 | A | | 2/1996 | Roshkoff | 283/81 |
| 5,588,239 | A | * | 12/1996 | Anderson | 40/630 |
| 5,605,730 | A | * | 2/1997 | Treleaven | 428/40.1 |
| 5,657,869 | A | | 8/1997 | Carroll | 206/451 |
| 5,700,537 | A | | 12/1997 | Instance | 428/41.9 |
| 5,738,382 | A | * | 4/1998 | Grosskopf et al. | 283/81 |
| 5,766,716 | A | | 6/1998 | Barry | 428/40.1 |
| 5,804,271 | A | | 9/1998 | Barry | 428/40.1 |
| 5,830,550 | A | | 11/1998 | Treleaven et al. | 428/40.1 |
| 5,863,628 | A | * | 1/1999 | Barry | 428/40.1 |
| 5,944,357 | A | | 8/1999 | Instance | 283/101 |
| 5,975,582 | A | * | 11/1999 | Treleaven | 428/40.1 |
| 6,027,598 | A | * | 2/2000 | Anderson | 156/253 |
| 6,613,410 | B1 | * | 9/2003 | Sellars | 428/40.1 |

* cited by examiner

*Primary Examiner*—J. A. Lorengo
(74) *Attorney, Agent, or Firm*—Myers Bigel Sibley & Sajovec

(57) ABSTRACT

A self-adhesive label for displaying information includes a leaflet, a tab member, and an adhesive layer. The leaflet has a lower surface and an end edge. The tab member is separately formed from the leaflet. An exposed portion of the tab member is disposed alongside the leaflet adjacent the end edge. The tab member has a lower surface. The adhesive layer includes a first adhesive portion engaging the lower surface of the leaflet and a second adhesive portion engaging the lower surface of the tab member. At least a portion of the leaflet does not overlie the tab member. The label may include a laminate cover overlying the upper surface of the leaflet and including a laminate tab portion overlying the exposed portion of the tab member.

20 Claims, 15 Drawing Sheets

LABEL HAVING TAB MEMBER AND METHODS FOR FORMING, APPLYING AND USING THE SAME

CLAIM FOR PRIORITY AND CROSS-REFERENCE TO OTHER APPLICATIONS

This application claims priority to and is a divisional of parent application Ser. No. 09/232,553 filed Jan. 18, 1999, now U.S. Pat. No. 6,329,324, the disclosure of which is hereby incorporated herein by reference in its entirety.

FIELD OF THE INVENTION

The present invention relates generally to labels, and, more particularly, to self-adhesive labels and methods for forming, applying and using the same.

BACKGROUND OF THE INVENTION

In the packaging of certain chemicals and pharmaceuticals, the manufacturer often is required or desires to provide a considerable amount of information concerning the chemical or pharmaceutical. In the case of pharmaceuticals, this is required by government regulations, however, the occasion may also arise, either separate from or in conjunction with government regulations, to provide the doctor, pharmacist or user with instructions on how the product should be used, what the product is, and safety precautions which should be followed in the use of the product. Sometimes the literature, which is generally in the form of folded leaflets, is placed within a box along with the container carrying the chemical or pharmaceutical (referred to as "inserts"). The placement of leaflets within the box is expensive and a cumbersome operation to perform. Also, it is difficult to insure by later inspection that the proper literature has been inserted in the proper package. Almost all products are packaged in outer cartons and many are not compatible with inserts. Further, the use of folded cartons is under scrutiny by environmental groups as involving excessive packaging. In an effort to meet this challenge, many companies are seeking ways to eliminate folding cartons that carry containers inside.

A different approach to solving this problem has developed over the last several years in which the folded literature is releasably attached to the face of the container (referred to as "outserts"), either directly to the container itself, or to a base label which, in turn, is secured to the container. The literature may then be removed by the customer. In such cases, the portion of the label remaining must carry both an "identification" of the product (for example, information such as trademark or manufacturer) as well as certain "statutory information" (for example, lot number and expiration date).

Thus, in order to meet the objectives of such labeling techniques, certain criteria must be met. First of all, the portion of the label which remains after the folded literature product is removed should contain both the identification of the product and the statutory information concerning the lot number and expiration date. Further, after the literature leaflet is assembled or affixed to the base label, the indicated area for statutory information concerning lot number and expiration date should be accessible for stamping or printing by the pharmaceutical company and visible to the consumer. The folded leaflet portion remains affixed to the label portion until the customer (doctor, pharmacist, consumer) desires its removal. It is critical that the proper literature must be affixed to the proper base label. Finally, all of the above criteria must be accomplished in a manufacturing technique that insures quality and is cost-effective.

Examples of labels designed to eliminate the separate base panel are disclosed in U.S. Pat. Nos. 5,207,746 and 5,263,743, each to Jones, and U.S. Pat. No. 5,738,382 to Grosskopf et al., the disclosures of which are hereby incorporated herein by reference in their entireties. While these labels and similar known label constructions are well suited for many applications, they suffer from certain significant drawbacks and limitations in manufacture, application, use and functionality.

Grosskopf et al. '382 discloses a label including a multiple panel leaflet and a laminate cover coextensive with the label. The leaflet includes an extended flap over which indicia such as the lot and expiration date of an associated product may be printed. A tear strip is positioned opposite the extended flap and a tear line is formed in the laminate cover adjacent the extended flap. It has been found that, when the user opens the label by means of the tear strip and pulls the laminate cover and title panel of the leaflet toward the extended flap, there is a tendency for portions of the laminate cover overlying the extended flap and portions of the extended flap to be torn away with the portion of the laminate cover which is intended to be removed. In doing so, critical indicia printed on or over the extended flap may be removed from the product or product packaging.

Self-adhesive labels are commonly applied to curved substrates (e.g., bottles) by applying a first end and continuously wiping on, rolling on or otherwise applying the remainder of the label until the opposite end is secured. Often, there is a tendency for the adhesive to be "squeezed" toward the second end. This results in an excessive, localized collection of adhesive which, when the label is fully applied, tends to ooze out from beneath the label. The oozed adhesive may degrade the functionality or aesthetics of the label and the associated product or packaging.

Thus, there exists a need for a label which provides for the securement of important indicia to an object such that removal of a portion of the label, for example portions of a leaflet or a laminate cover, will not tend to result in the removal of the important indicia. There also exists a need for an adhesive-type label which minimizes the tendency for the adhesive to ooze from beneath the label when the label is applied to a curved substrate such as a bottle. There exists an additional need for such labels which include multiple panel, extended text leaflets and protective laminate covers. Furthermore, there exists a need for methods for forming such labels which satisfy the regulations and safety concerns associated with the manufacture of labels for pharmaceuticals, chemicals and the like.

SUMMARY OF THE INVENTION

In view of the foregoing, it is an object of the present invention to provide a self-adhesive label which provides for the securement of important indicia to an object such that removal of a portion of the label will not cause removal of the important indicia.

It is also an object of the present invention to provide such a label which may include a protective laminate cover.

Moreover, it is an object of the present invention to provide such a label which may include a multi-panel leaflet.

It is a further object of the present invention to provide a self-adhesive label which minimizes the tendency for adhesive buildup and ooze when the label is applied to a curved substrate such as a bottle.

It is yet another object of the present invention to provide methods for forming such labels which satisfy the regulations and safety concerns associated with the manufacture of labels for pharmaceuticals, chemicals and the like.

In order to satisfy the foregoing and other objects, the present invention is directed to a self-adhesive label for displaying information. The label includes a leaflet, a tab member, an adhesive layer and a laminate cover. The leaflet has a lower surface and an end edge. The tab member is separately formed from the leaflet. An exposed portion of the tab member is disposed alongside the leaflet adjacent the end edge. The tab member has a lower surface. The adhesive layer includes a first adhesive portion engaging the lower surface of the leaflet and a second adhesive portion engaging the lower surface of the tab member. The laminate cover overlies the upper surface of the leaflet and includes a laminate tab portion overlying the exposed portion of the tab member. The laminate cover is secured to the leaflet and the exposed portion by a laminate adhesive. At least a portion of the leaflet does not overlie the tab member.

According to certain preferred embodiments, the leaflet includes a top panel overlying and connected to the bottom panel along a fold, the fold forming the end edge. Preferably, an access tear line is formed in the laminate cover adjacent the fold. The label may further include a removal tear line formed in the laminate cover adjacent an end of the label opposite the access tear line. Preferably, indicia overlies the exposed portion of the tab member.

The tab member may include an underlap portion underlying a first portion of the leaflet such that the underlap portion is interposed between the adhesive layer and the first portion and a second portion of the leaflet does not overlie the tab member and engages the adhesive layer. Preferably, the exposed portion of the tab member has a length of at least 3⁄16 inch. Preferably, the underlap portion of the tab member has a length of between about 1⁄16 and 1⁄4 inch.

Alternatively, the tab member may have an inner edge positioned substantially immediately adjacent the end edge. Preferably, the exposed portion of the tab member has a length of at least 3⁄16 inch.

As a further alternative, the tab member may have an inner edge spaced apart from the end edge, the inner edge and the end edge defining a gap therebetween. A portion of the laminate cover overlies the gap. Preferably, the gap has a length of between about 1⁄32 and 1⁄4 inch.

The present invention is further directed to a method for forming self-adhesive labels using a web, first and second unitary leaflets, each of the leaflets including a bottom panel and an extended flap, and an adhesive. The leaflets are placed onto the web in successive relation such that the leaflets are secured to the web by the adhesive layer. A laminate web and a laminate adhesive are applied over the leaflets and the release liner such that the laminate web is secured to the leaflets by the laminate adhesive. The laminate web and the leaflets are cut to form the labels. The cutting step includes cutting through the laminate web to form a laminate cover overlying each label. The cutting step also includes cutting through the extended flap of the first leaflet such that a first portion of the extended flap thereof remains with the first leaflet and forms a part of a first label and a second portion of the first leaflet extended flap is severed from the first leaflet extended flap and forms a tab member forming a part of a second adjacent label. An exposed portion of the tab member is disposed alongside the second leaflet.

The leaflets may be placed in imbricated relation such that a first portion of the extended flap of the first leaflet is interposed between an underlap portion of the bottom panel of the second leaflet and the adhesive layer. The extended flap of the first leaflet is cut at a location spaced apart from the bottom panel of the second leaflet, whereby the tab member forming a part of the second label includes an underlap portion interposed between the bottom panel thereof and the adhesive layer, the second leaflet including a second portion engaging the adhesive layer and not overlying the tab member.

Alternatively, the leaflets may be placed such that an end edge of the extended flap of the first leaflet is disposed substantially immediately adjacent an end edge of the second leaflet.

Alternatively, the leaflets may be placed such that an end edge of the extended flap of the first leaflet is spaced apart from an adjacent end edge of the second leaflet. The end edges define a gap therebetween. A gap portion of the laminate cover overlies the gap.

The method may further include printing indicia on a tab portion of the laminate cover overlying the exposed portion of the tab member.

The method may further include forming an access tear line in the laminate cover of the first label adjacent the tab member thereof. A removal tear line may be formed in the laminate cover of the first label adjacent the extended flap of the first label.

The present invention is further directed to a method of applying a label as described above of the type having an underlap portion to a curved substrate. Starting with the end of the label opposite the tab member, the label is applied to the substrate in the direction of the end of the label adjacent the tab member. A portion of the adhesive layer is displaced and collects along the inner edge of the tab member and/or between the underlap portion and the leaflet.

The present invention is further directed to a method of using a label as described above of the type wherein the leaflet includes a top panel overlying and connected to the bottom panel along a fold line and an access tear line formed in the laminate cover. The label is applied and secured to a substrate by means of the adhesive layer. The laminate cover and the top panel are torn along the access tear line and portions of the laminate cover and the top panel are pulled in the direction of the extended flap and away from the remainder of the label to remove the portions of the laminate cover and the top panel from the label. The tab member is retained with the remainder of the label.

The method may further include tearing the laminate cover along a removal tear line formed therein adjacent the extended flap following tearing the laminate cover. Indicia may be printed on the laminate tab portion. The indicia may include a lot identifier and/or an expiration date.

The present invention is further directed to a self-adhesive label for displaying information including a leaflet having an end edge, a first portion and a second portion, each of the first and second portions having a respective lower surface. A tab member is separately formed from the leaflet and has a lower surface. The tab member includes an exposed portion disposed alongside the leaflet adjacent the end edge and an underlap portion underlying the first leaflet portion. The underlap portion has an upper surface facing the lower surface of the first leaflet portion. The second leaflet portion does not overlie the tab member. A first adhesive layer is interposed between and secures the upper surface of the underlap portion and the lower surface of the first leaflet portion. A second adhesive layer is provided including a first adhesive portion engaging the lower surface of the tab member and a second adhesive portion engaging the lower surface of the second leaflet portion.

The present invention is further directed to a method for forming self-adhesive labels using a web, first and second unitary leaflets, each of the leaflets including a bottom panel and an extended flap, and a base adhesive layer. The leaflets are placed onto the web in successive, imbricated relation such that an underlap portion of the extended flap of the first leaflet is interposed between a first portion of the bottom panel of the second leaflet and the base adhesive layer, whereby the leaflets are secured to the web by the base adhesive layer. The leaflets are cut to form the labels. The cutting step includes cutting through the first leaflet extended flap at a location spaced apart from the bottom panel of the second leaflet such that a first portion of the first leaflet extended flap remains with the first leaflet and forms a part of a first label and a second portion of the first leaflet extended flap is severed from the first leaflet and forms a tab member forming a part of a second, adjacent label, at least an exposed portion of the tab member disposed alongside the second leaflet. The method may further include the step of applying a securing adhesive to at least one of the leaflets such that the underlap portion of the first leaflet extended flap is secured to the first portion of the bottom panel of the second leaflet by the securing adhesive.

DETAILED DESCRIPTION OF THE PREFERRED EMBODIMENTS

Figure 1:
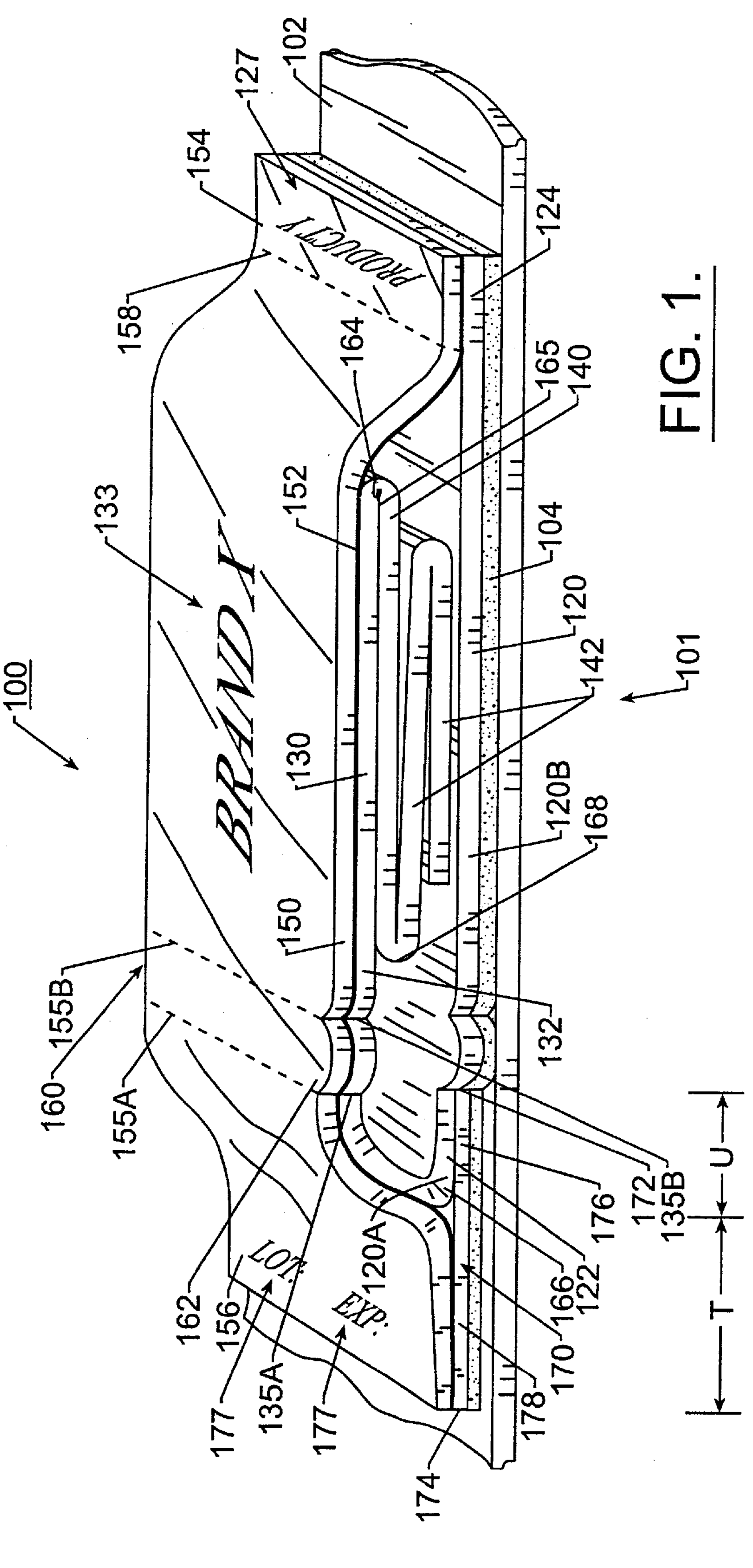
FIG. 1 is a perspective view of a label according to a first embodiment of the present invention disposed on a release liner.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout. It will be understood that when an element such as a layer, region or substrate is referred to as being “on” another element, it can be directly on the other element or intervening elements may also be present. In contrast, when an element is referred to as being “directly on” another element, there are no intervening elements present.

Figure 3:
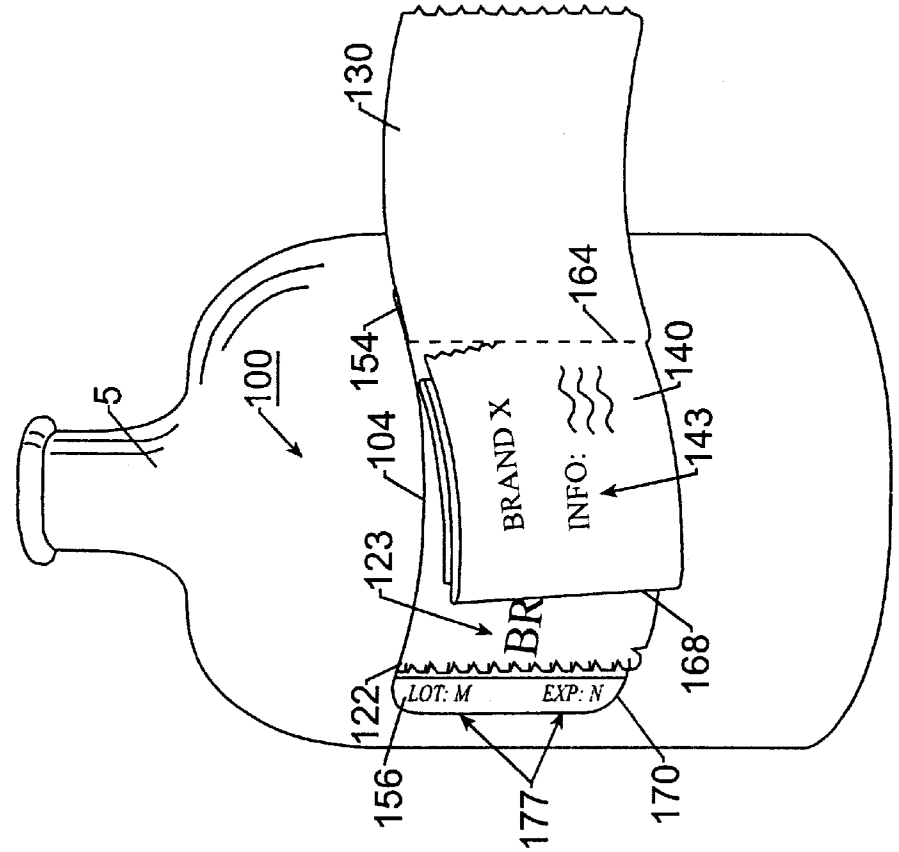
FIG. 3 is a perspective view of the label of FIG. 1 secured to a container, the tear strip being completely removed and the top panel, a portion of the laminate cover and the first interior panel thereof being partially removed.
Figure 2:
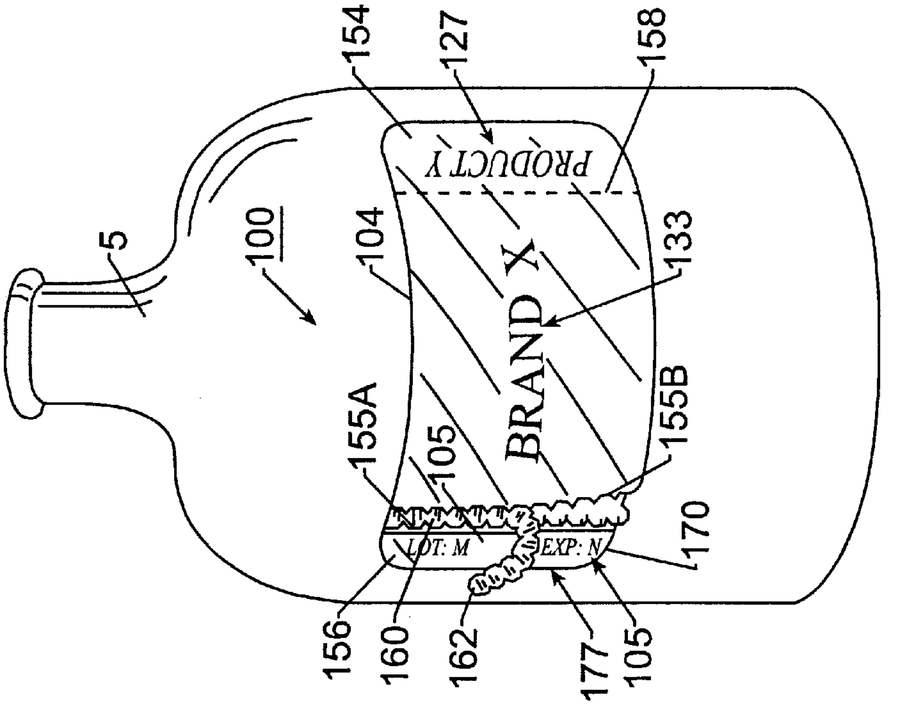
FIG. 2 is a perspective view of the label of FIG. 1 secured to a container, a tear strip thereof being partially removed.

With reference to FIGS. 1–3, a label according to a first embodiment of the present invention, generally denoted by the numeral 100, is shown therein. The label 100 includes a leaflet 101 and a laminate cover 150. The label 100 is releasably secured to a release liner 102 by a pressure-sensitive adhesive layer 104. The adhesive layer 104 remains with the label 100 when it is removed from the release liner 102 and serves to secure the label 100 to a container 5 (FIGS. 2 and 3). The label 100 includes a discrete, adhesive backed tab member 170 formed separately from and partly underlapping the leaflet 101, as discussed in more detail below.

The leaflet 101 includes a bottom panel 120, a top panel 130, a first interior panel 140, and additional interior panels 142. The top panel 130 and the bottom panel 120 are joined along a fold 166. The top panel 130 and the first interior panel 140 are joined along a fold 165. The top panel 130 includes parallel, spaced apart tear lines 135A and 135B formed therein. A tear line 164 is formed along the fold 165 or, alternatively, in the panel 140 adjacent the fold 165. The top panel 130 includes a marginal portion 132 extending between the fold 166 and adjacent the edge 168 of the interior panel 140. The bottom panel 120 includes a marginal portion 122 extending between the fold 166 and adjacent the edge 168. The bottom panel 130 further includes a marginal extended flap 124 extending outwardly beyond the top panel 130. Suitable title indicia 133 is printed on the upper surface of the top panel 130. Indicia 127 such as a product description or the like may be printed on the upper surface of the marginal extended flap 124. As discussed below, the information represented by the indicia 127 preferably is not of the type which must remain with the label following removal of the laminate cover 150. Indicia 123, preferably substantially identical to the title indicia 133, is disposed on the upper surface of the bottom panel 120. Other suitable indicia 143, for example, instructions and warnings, are printed on the panels 140, 142.

The leaflet 101 is preferably formed from a unitary blank of 60 lbs. coated paper or litho stock. Methods and apparatus for forming the leaflets 101 will be appreciated by those of ordinary skill in the art upon a reading of the foregoing and the following.

The tab member 170 is secured to the release liner 102 by a portion of the adhesive 104. The tab member 170 partly underlaps the leaflet 101. More particularly, a first portion 176 of the tab member 170 extends from a first end 172 to the end fold 166 of the leaflet 101. Accordingly, the first portion 176 underlaps a portion 120A of the bottom panel 120 of the leaflet 101. A second, exposed portion 178 of the tab member 170 extends outwardly from the leaflet 101 from the fold 166 to a second end 174. By "exposed", it is meant that the portion 178 of the tab member 170 is not covered by the leaflet 101 but may be covered by the laminated cover 150. Notably, the underlapping portion 176 is not adhered to the leaflet 101 and separates the overlying portion 120A of the leaflet 101 from the adhesive 104. A remaining portion 120B of the leaflet 101 does not overlie the tab member 170 and directly engages the adhesive 104. Suitable indicia 177 such as prompts "LOT:" and "EXP:" for product lot number and expiration date, respectively, may be printed on the tab member exposed portion 178.

The tab member 170 is preferably formed of the same material as the leaflet 101. Preferably, the tab member 170 is formed of an opaque material. Preferably, the tab member portion 176 has a length U (see FIG. 1) of between about $\frac{1}{16}$ and $\frac{1}{4}$ inch, and, more preferably, of between about $\frac{1}{8}$ and $\frac{1}{4}$ inch. Preferably, the portion 178 has a length T of at least $\frac{3}{16}$ inch, more preferably, of at least $\frac{3}{8}$ inch, and, more preferably, of between about $\frac{3}{8}$ and $\frac{3}{4}$ inch. The underlapping portion 176 of the tab member 170 may extend farther beneath the bottom panel 120 than shown in the Figures. Preferably, however, the leaflet portion 120A which overlies the tab member portion 176 is smaller than the portion 120B of the leaflet which directly engages the adhesive 104.

The laminate cover 150 overlies the leaflet 101 and the tab member 170 and is secured thereto by a laminate adhesive 152. More particularly, a laminate portion 154 is secured to the upper surface of the marginal extended flap 124, a laminate tab portion 156 is secured to the upper surface of the exposed portion 178 of the tab member 170, and the remainder of the laminate cover 150 is secured to the upper surface of the top panel 130. Tear lines 155A and 155B are formed in the laminate cover 150 overlying the tear lines 135A and 135B, respectively, of the top panel 130. A tear line 158 is formed in the laminate cover 150, preferably adjacent the fold 165. Preferably, the laminate cover 150 is coextensive with the label 100, as shown.

The laminate cover 150 is preferably formed from transparent or translucent material such as polypropylene. Suitable laminate materials include, for example, 2 mil polypropylene Product No. 04324 available from Madico, Incorporated of Woburn, Mass.

The portion of the laminate cover 150 defined between the tear lines 155A and 155B and the portion of the top panel 130 defined between the tear lines 135A and 135B together form a tear strip 160. Preferably, the label 100 is formed such that the tear strip 160 includes a tab 162 to facilitate manipulation of the tear strip. The tear strip 160 lies entirely in a marginal portion 132 and overlies only a marginal portion 122 of the bottom panel 120. The marginal portions 122, 132 are preferably from about 0.1875 to about 0.25 inches wide each. Further, the tear line 135B is formed from about 0.3125 to about 0.625 inches laterally away from the adjacent edge 168.

With reference to FIGS. 2 and 3, the label 100 is shown therein secured to a suitable container 5 by the adhesive layer 104. Prior to manipulation by the end user, the label 100 is positioned in the closed and sealed position of FIG. 1. In this position, the indicia 127, 133 and 177 are visible. If desired, a manufacturer or packager, for example, may print suitable indicia 105 on the upper surface of the laminate cover portion 156. For example, the manufacturer may, before or at the time of packaging, print the actual lot number and expiration date where prompted by the indicia 177.

When the end user wishes to open the label 100 to inspect the indicia 123 and/or the indicia 143, he or she may do so by grabbing the tab 162 and pulling the tear strip 160 upwardly and outwardly (as shown in FIG. 2), thereby severing the top panel 130 along the tear lines 135A, 135B, 155A, and 155B. Thereafter, the end user may fold the top panel 130 outwardly as shown in FIG. 3. Once the label 100 has been opened as described above, the end user may remove the top panel 130 (and the portion of laminate cover 150 adhered thereto) and the interior panels 140, 142 by tearing along the tear line 158 of the laminate cover 150. Alternatively, the end user may remove the interior panels 140, 143 by tearing along the tear line 164, leaving the top panel 130 and the attached portion of the laminate cover 150 with the container 5.

As the user attempts to tear the portion of the laminate cover 150 between the tear lines 155B and 158 by pulling the laminate cover in a left-to-right direction (as shown in FIGS. 2 and 3), the user may inadvertently pull away a portion of the laminate cover portion 154 therewith. That is, the user may pull the laminate cover away with such vigor that the tear line 158 is defeated. In doing so, the user may remove a portion of the indicia 127 (or other indicia printed on the laminate portion 154 or the underlying extended flap 124) from the label 100 and the associated product. Accordingly, it is preferred that the indicia provided in these areas be of a type which may be removed from the label without significant adverse consequences, for example, without undermining safety precautions associated with a pharmaceutical product.

Information of a more important or critical nature should instead be printed on the tab member portion 178 or the laminate cover portion 156 as appropriate. Notably, and with reference to FIGS. 2 and 3, these elements of the label do not face significant risk of inadvertent removal. The removal of the tear strip 160, in contrast to the removal of the laminate cover, is accomplished by tearing the laminate cover along a direction perpendicular to the length of the label. Accordingly, the tear stresses do not tend to be directed into the laminate cover tab portion 156. Thus, placement of the indicia 177, 105 or other indicia on the tab member portion 178 or the laminate tab portion 156 insures that the indicia will remain with the label and the associated product.

A further benefit of the label 100 is that the tab member 170, which is preferably opaque, provides a consistent backing for printed indicia. In this way, the printable, exposed area of the label 100 is increased. In the absence of the tab member 170, the visibility of the indicia may depend on the color of the substrate if the laminate cover is transparent or translucent.

Yet another benefit of the label 100 relates to the application of the label 100 to a curved substrate such as the bottle 5. Preferably, the label is applied to the bottle 5 by first applying the end adjacent the extended flap 124 and continuing to roll or wipe the label onto the bottle until the end of the label adjacent the tab member 170 is adhered to the bottle 5. At least a portion of the adhesive 104 which tends to be squeezed forward during this process is captured along the end edge 172 of the tab member 170 or between the underlapping portion 176 and the bottom panel portion 120A of the leaflet. By providing a location for the adhesive 104 to accumulate, the tendency for sideward adhesive ooze may be reduced or eliminated.

Figure 4:
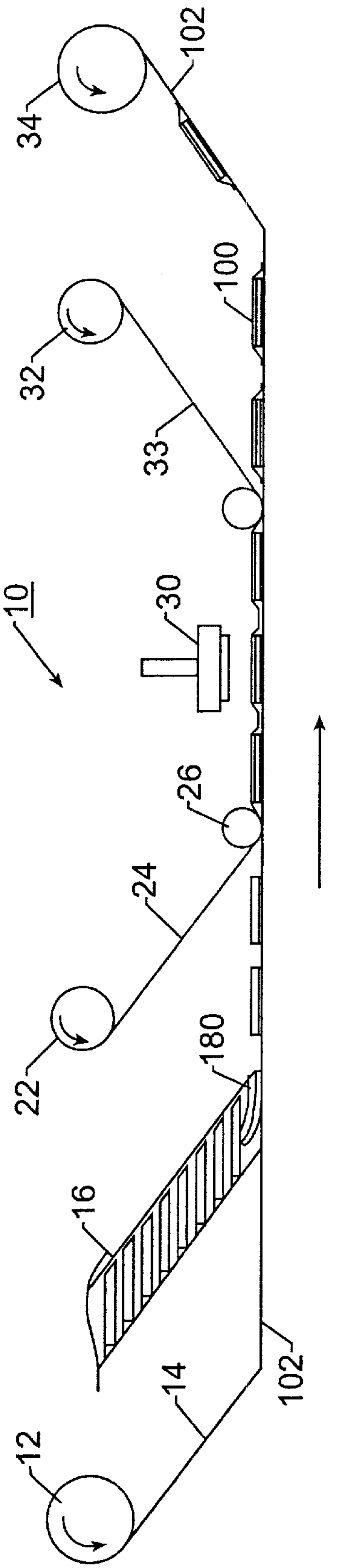
FIG. 4 is a diagram of an apparatus for forming labels as shown in FIG. 1.

With reference to FIG. 4, an apparatus for forming the labels 100 according to a preferred method of the present invention is shown therein. First, a suitable web 14 is supplied from an unwind station 12. The web 14 may be a transfer tape such as 3M Product No. 9447, 1 mil High Tenacity Tape with 320 Adhesive. The transfer tape preferably includes the release liner 102 having an adhesive layer of pressure sensitive adhesive on the upper surface thereof. Transfer tapes having a second release liner layer located on the adhesive layer may also be used. Alternatively, the web 14 may be a release liner to which pressure sensitive adhesive is applied, either as patches of adhesive or as a continuous adhesive layer, to the upper surface thereof by an adhesive applicator. The adhesive application step may occur just prior to the application of each leaflet 180 to the web 14. Alternatively, the adhesive may be applied to the lower surfaces of the leaflets 180.

Alternatively, the web 14 may be a double coated tape consisting of the release liner 102, a first adhesive layer coating the upper surface of the release liner, a carrier preferably formed from a polymeric material such as polypropylene substrate overlying the first adhesive layer, and a second adhesive layer overlying the carrier. Double coated tape as described may be formed by applying a pressure sensitive adhesive coating to the upper surface of a self adhesive polypropylene substrate disposed on a release liner, such as 3M Scotch Brand Tape Product No. 7214FL 2 mil polypropylene. Double coated tapes having a second release liner layer located on the second adhesive layer may also be used. Double coated tapes having carriers formed from polyester, polystyrene, polyethylene or other polyolefins may be used as well. A suitable product having a polyester carrier is Flexcon Flexmark Product No. DFM-100-Clear V-23/70 D/FK. Notably, if labels are formed from double coated tape as just described, the resulting labels would not be constructed as described in the first embodiment and the further embodiments as discussed below, but rather would include an additional adhesive layer and a carrier interposed between the label as shown and the release liner.

As a further alternative, the web 14 may be a pressure-sensitive face stock consisting of a release liner, an adhesive layer coating the upper surface of the release liner, and a web of paper or the like releasably secured to the release liner by the adhesive. Suitable pressure-sensitive face stocks include semi-gloss face stock with S746 adhesive available from Fasson Incorporated of Painesville, Ohio. Pressure-sensitive adhesive corresponding to the adhesive 104 is applied, either as patches of adhesive or as a continuous adhesive layer, to the upper surface of the face stock. Notably, if labels are formed from pressure-sensitive face stock as just described, the resulting labels would not be constructed as described in the first embodiment and further embodiments as discussed below, but rather would include an additional adhesive layer and a base face stock portion interposed between the label as shown and the release liner.

Figure 5:
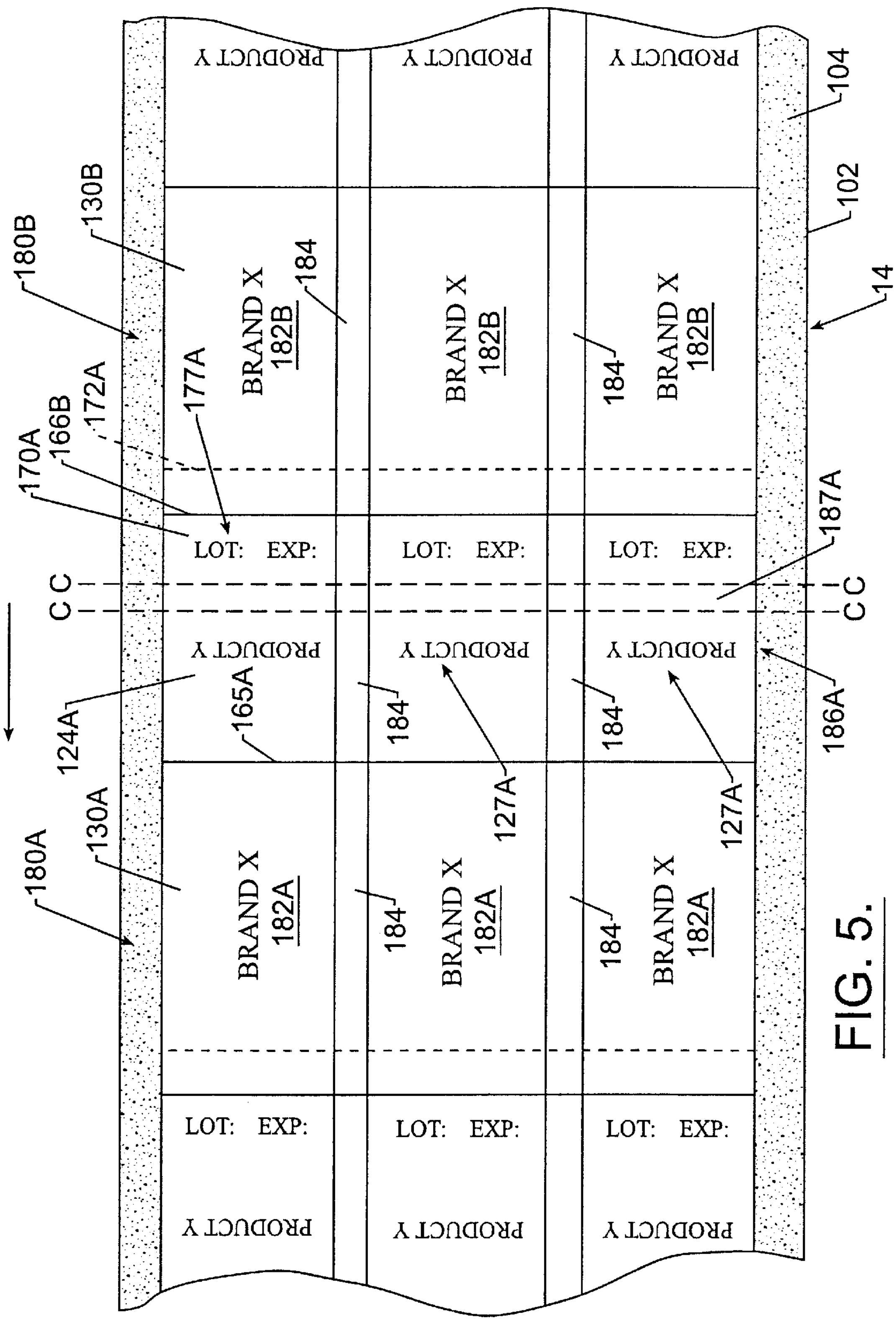
FIG. 5 is a fragmentary, top plan view of the release liner and multiple-up leaflets used to form labels as shown in FIG. 1.

With reference to FIG. 5, the leaflets 180 (two of which are designated in FIG. 5 as leaflets 180A and 180B) are preferably provided as "multiple-up" leaflets; however, it will be appreciated by the skilled artisan that individual leaflets may be used as well. By "multiple-up leaflet" it is meant a unitary leaflet which is suitably printed with indicia corresponding to multiple individual leaflets such that, when the multiple-up leaflet is properly cut, the multiple up leaflet is severed into multiple, discrete individual leaflets each bearing the desired respective indicia. As shown, each multiple-up leaflet 180A, 180B includes three leaflet portions 182A, 182B corresponding to individual leaflets 101 and waste strips 184 interposed between the leaflet portions 182A, 182B. The leaflets 180 are applied to the web 14 by a leaflet application station 16.

Figure 6:
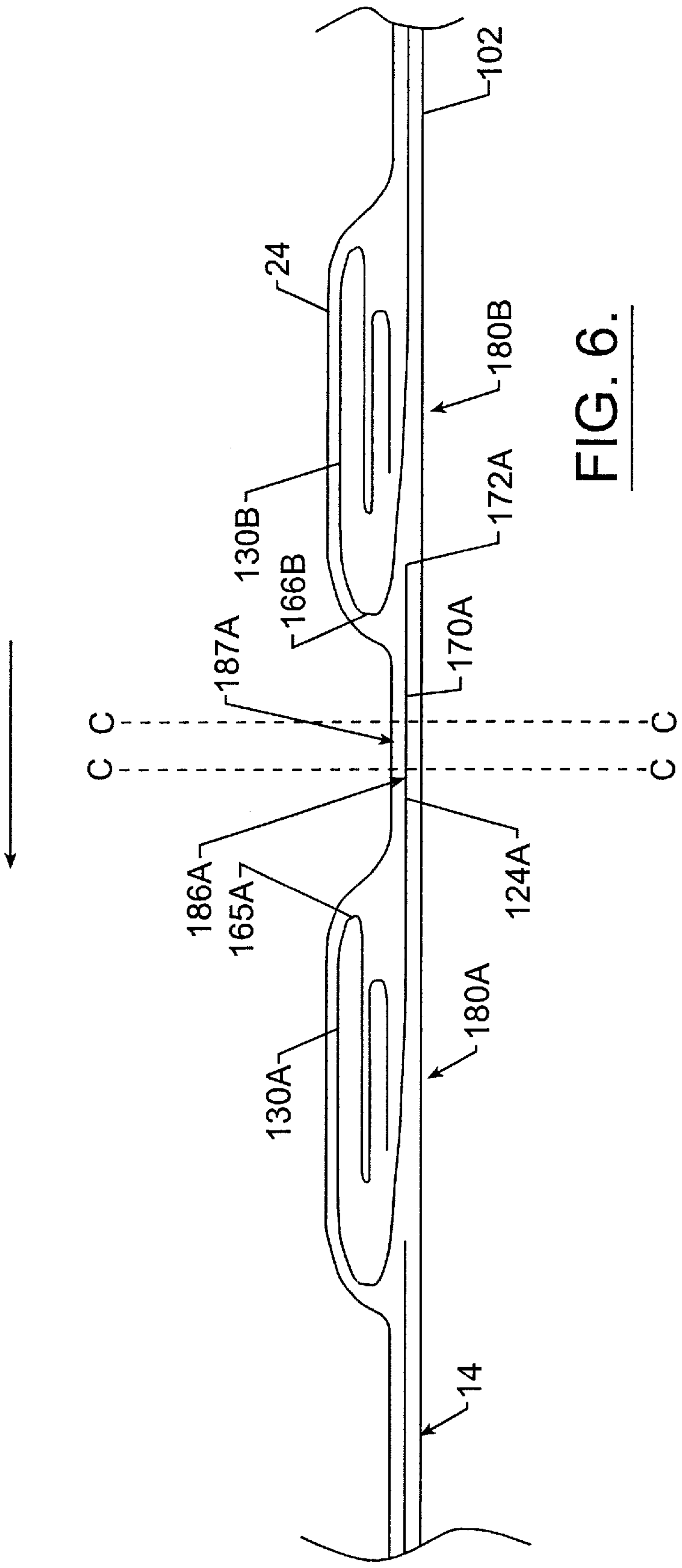
FIG. 6 is a schematic, side view of the release liner and multiple-up leaflets of FIG. 5, wherein the leaflets and release liner are covered by a laminate web and a cut line is indicated.

The leaflets 180A, 180B are applied consecutively to the web 102 which is conveyed in the direction as indicated by the arrow in FIGS. 5 and 6. Generally, each leaflet 180 has an extended flap (for example, extended flap 186A of the leaflet 180A) which is ultimately cut and separated to form the extended flap 124 of one label 100 and the tab member 170 of the following (i.e., downstream), adjacent label 100. For purposes of explanation, the relative placement of the leaflets 180A, 180B will be discussed hereafter; however, each of the adjacent leaflets 180 may be similarly placed, handled and processed.

The leaflet 180A has portions or elements 124A, 127A, 130A, and 165A which correspond to elements 124, 127, 130 and 165, respectively, of a first row (traversing the web 14) of labels 100 to be formed. The leaflet 180A also has elements 170A, 177A and 172A which correspond to elements 170, 177 and 172 of the next following row of labels 100 to be formed. The leaflet 180B also includes elements 130B and 166B corresponding to elements 130 and 166 of this next row of labels.

The leaflet 180A is first laid on the release liner 102 and the leaflet 180B is thereafter laid on the release liner and partly over the leaflet 180A. In this way, the leaflets 180A and 180B are seriated and imbricated such that a portion of the extended flap 186A of the leaflet 180A underlaps the leaflet 180B, including the end fold 166B thereof.

With reference to FIGS. 4 and 6, a self adhesive laminate web 24 is supplied by an unwind station 22 and adhered by a nip roller 26 and the adhesive thereof over the leaflets 180 and the web 14. A die cut station 30 cuts through the laminate web 24 thereby forming the laminate covers 150, the leaflets 101 and the tab members 170. More particularly, the diecut forms cut lines coextensive with the labels 100. These cut lines include a pair of cut lines C—C (see FIGS. 5 and 6) extending transverse to the length of the web and down to the release liner 102. While the cut lines C—C are shown as extending fully across the web 14 for clarity, the cut lines preferably do not extend across the entire width of the web 14 or of the laminate web 24. Rather, the cut lines C—C should stop short of one or both side edges of the laminate web 24 so that the waste matrix as discussed below may be removed as a continuous web. The cut lines C—C separate the extended flap 186A of the multiple-up leaflet 180A into the extended flap 124 of a first label 100 and the tab member 170 of the next, downstream label 100, and form a waste portion 187A (which includes portions of the leaflet 180A and the laminate web 24) between the cut lines C—C.

Each of the tear lines 135A, 135B, 155A, 155B, and 158 and the tab 162 may be formed by the die cut station 30 or a further die cut station. The tear lines 135A, 135B, and 164 may be formed in the leaflet 20 prior to application to the web. Tear lines (not shown) may be formed in the bottom panel underlying the tear lines 135A and 135B if desired or to facilitate manufacture.

A waste matrix 33 including the portions of the laminate web 24 outside the laminate covers 150, the waste strips 184, the waste portions 187A, and the underlying adhesive 104 are removed by a winding station 32. The web 14 may be slit into a plurality of release liners 102 and the resulting labels 100 carried on the release liners 102 may then be collected on a roll by a winding station 34 or sheeted and stacked.

The method of forming the label 100 as just described provides a substantial benefit in meeting regulatory and safety concerns in the manufacture of certain types of labels, for example, pharmaceutical labels. Because each printed component (the tab member 170 and the leaflet 101) are formed from the unitary leaflets 180 which may all be printed in the same manner and as a common batch, there is no risk of inadvertently mismatching dissimilar printed components such as separately printed base portions and leaflets.

Figure 7:
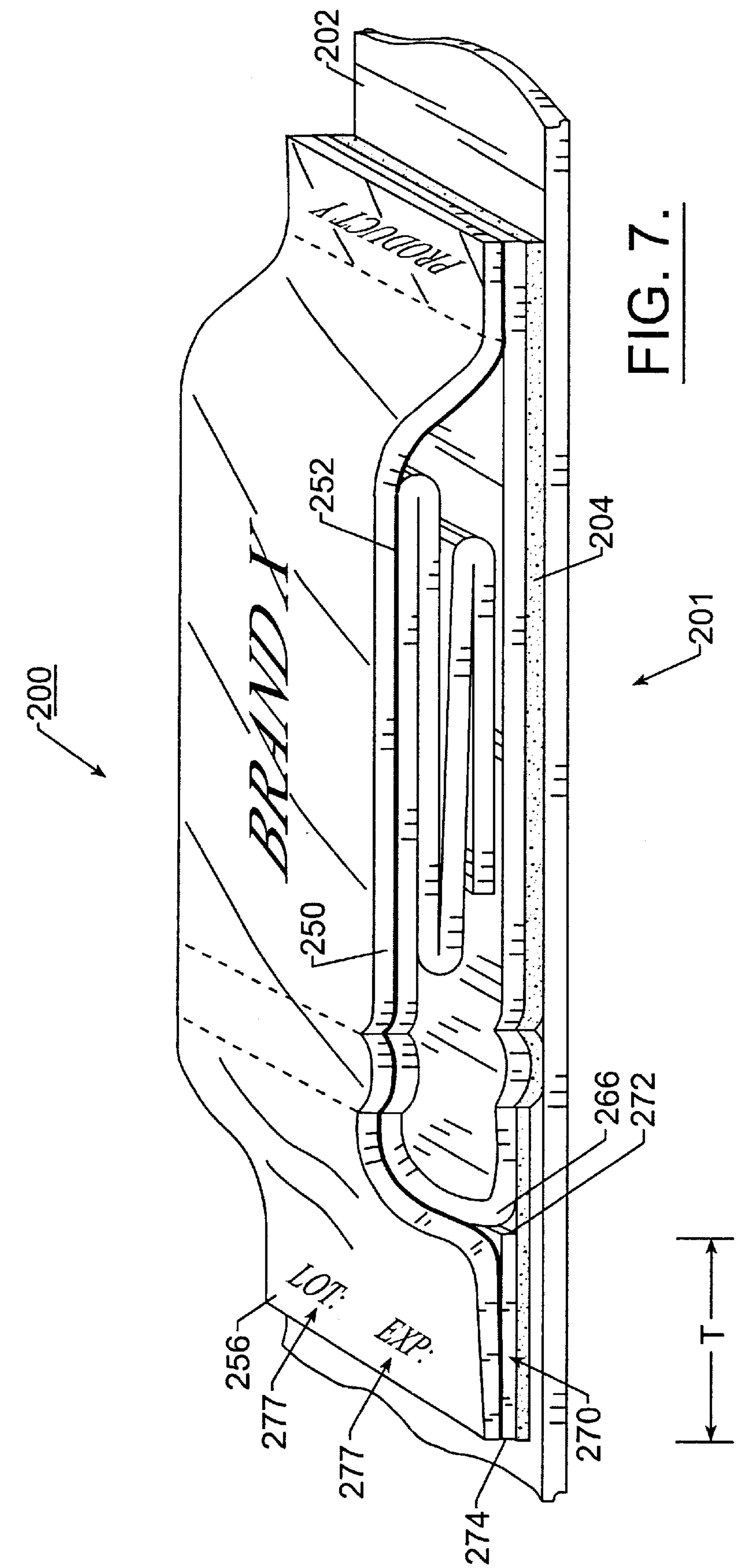
FIG. 7 is a perspective view of a label according to a second embodiment disposed on a release liner.

With reference to FIG. 7, a label 200 according to a second embodiment of the present invention is shown therein. The label 200 is releasably adhered to a release liner 202 by a pressure-sensitive adhesive layer 204 and includes a leaflet 201 which is identical to the leaflet 101. A laminate cover 250 corresponding to the laminate cover 150 is secured to the leaflet and a tab member 270 by means of a laminate adhesive 252. The tab member 270 has indicia 277 printed on the upper surface thereof. The label 200 differs from the label 100 in that the entirety of the tab member 270 (extending between opposed ends 272 and 274) extends outwardly beyond the leaflet 201. Thus, in this embodiment none of the leaflet 201 overlies the tab member 270. The end 272 of the tab member 270 is positioned substantially flush with the end fold 266 of the leaflet 201. The tab member 270 is covered by a laminate portion 256. The length T of the tab member 270 is preferably the same as discussed above with regard to the length T of the tab member 170.

It will be appreciated that the label 200 may be used in the same manner as the label 100 and will provide similar advantages.

Figure 8:
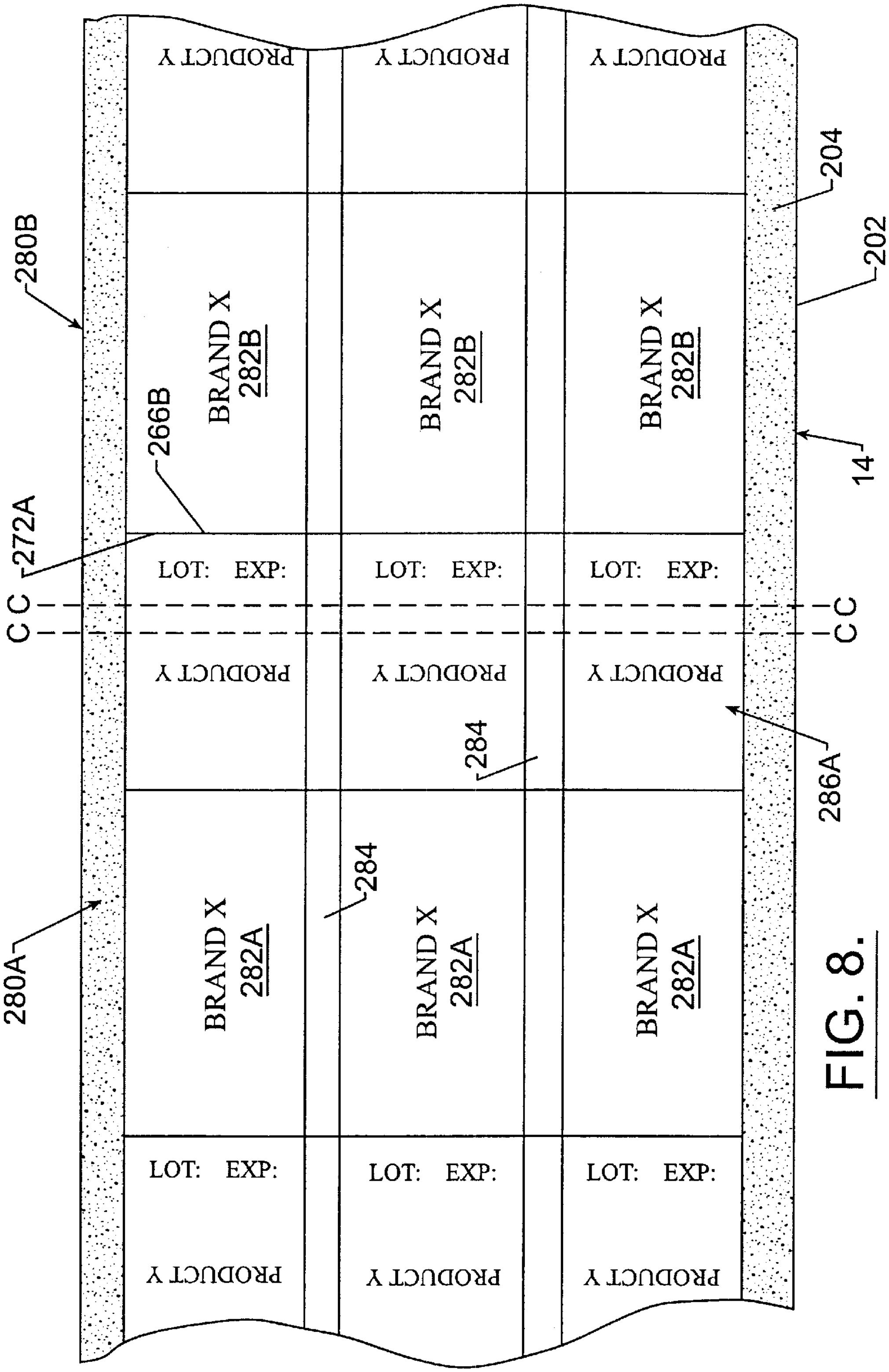
FIG. 8 is a fragmentary, top plan view of the release liner and multiple-up leaflets used to form labels as shown in FIG. 7.

The manufacture of the labels 200 may be accomplished in substantially the same manner and using substantially the same apparatus as described above with respect to the labels 100. The preferred method of manufacturing differs only in the relative placement of the leaflets and the lengths of the extended tabs of the multiple-up leaflets. With reference to FIG. 8, multiple-up leaflets 280A and 280B corresponding substantially to the leaflets 180A and 180B, respectively, are provided. The leaflets 280A, 280B include individual leaflet portions 282A, 282B and waste portions 284.

The leaflets are laid on the web 14 in seriatim and end to end. For example, the edge 272A which forms a part of the extended flap 286A of the leaflet 280A and which corresponds to the tab member end 272 of the label 200, is positioned immediately adjacent the end fold 266B of the leaflet 280B, which corresponds to the end fold 266 of the label 200. In the die cutting step, the extended flap 286A and the laminate web are cut along the lines C—C of FIG. 8. The formation of the labels 200 is otherwise the same as described above with respect to the labels 100.

Figure 9:
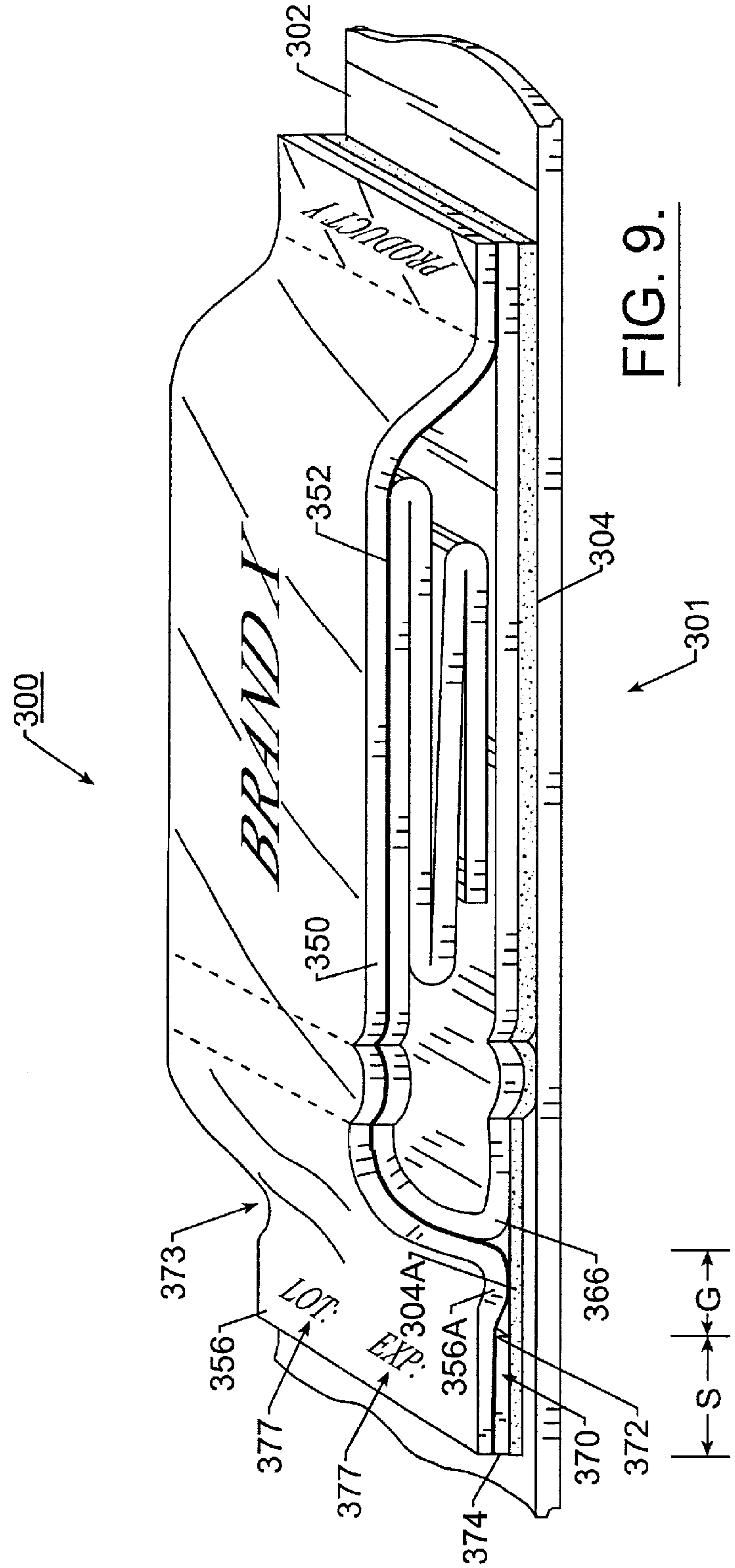
FIG. 9 is a perspective view of a label according to a third embodiment disposed on a release liner.

With reference to FIG. 9, a label 300 according to a third embodiment is shown therein. The label 300 is releasably adhered to a release liner 302 by a layer of pressure-sensitive adhesive 304. The label 300 includes a leaflet 301 identical to the leaflet 101 and a laminate cover 350 adhered to each of the leaflet 301, a tab member 370 and a portion of the adhesive 304 by a laminate adhesive 352. The tab member 370 is preferably formed of the same materials as described above with regard to the tab member 170. The tab member 370 has indicia 377 printed on the upper surface thereof. The label 300 differs from the label 100 in that a gap 373 is defined between the edge 372 of the tab member 370 and the end fold 366 of the leaflet 301. Thus, the tab member is disposed adjacent and spaced apart from the end fold 366. As a result, a portion 356A of the laminate tab portion 356 is directly adhered to a portion 304A of the adhesive 304. None of the leaflet 301 overlies the tab member 370.

Preferably, the gap length G extending between the end edge 372 and the fold 366 is between about 1/32 and 1/4 inch and, more preferably, between about 1/8 and 1/4 inch. Preferably, the length S of the tab member 370 extending between the first edge 372 and the opposed edge 374 is at least 3/16 inch, and more preferably, between about 3/8 and 3/4 inch.

Label 300 may be advantageous if, on the one hand, it is desired to not have an underlap portion which may add to the thickness of the label adjacent the fold 366, and, on the other hand, it is desired to provide substantial manufacturing tolerances for placement of the leaflets. The gap may be provided to be sensed by a photosensor for assisting in control of the manufacturing apparatus. The gap may also be provided in order to allow a portion of the container to be visible through the label.

Figure 10:
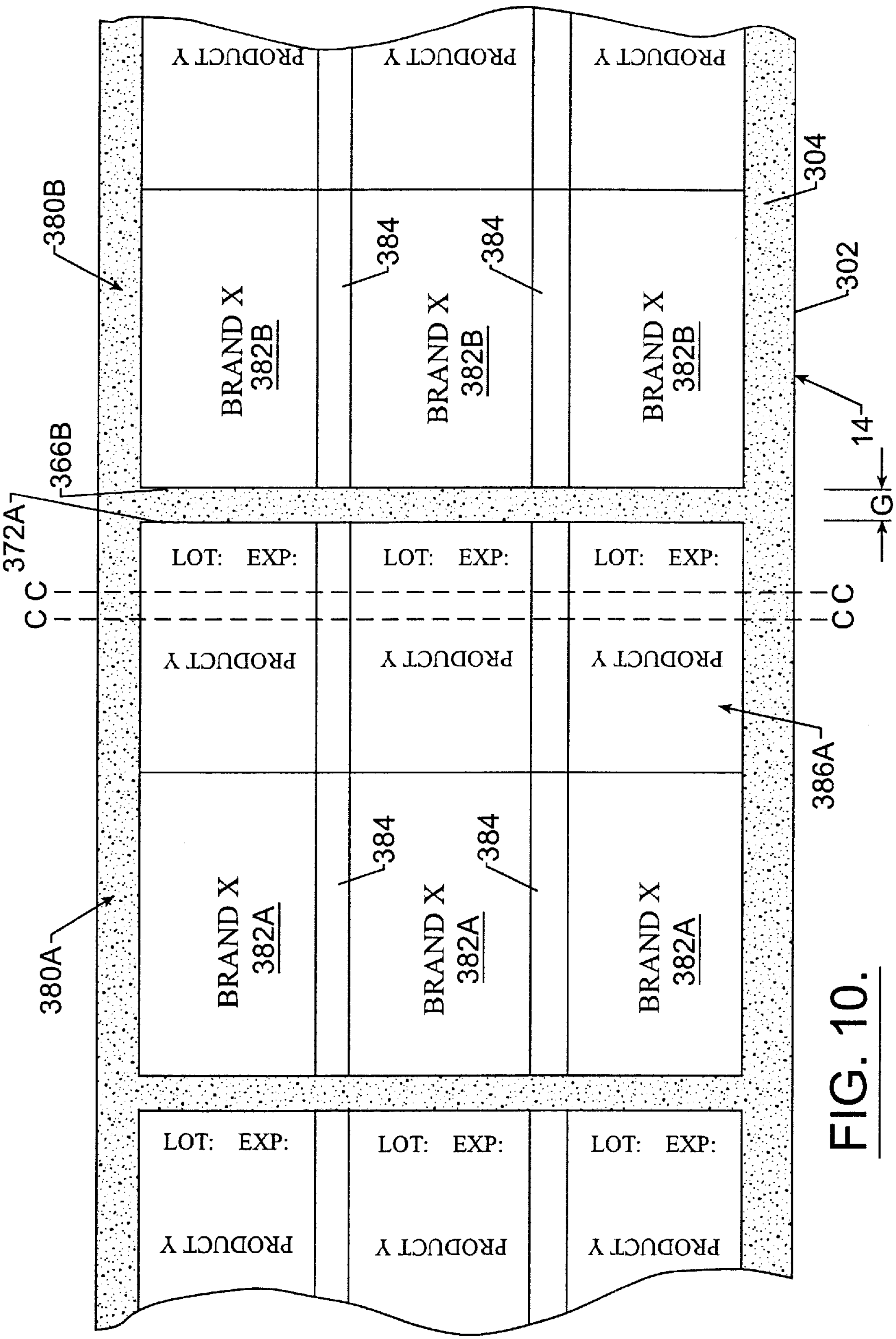
FIG. 10 is a fragmentary, top plan view of the release liner and multiple-up leaflets used to form labels as shown in FIG. 9.

With reference to FIG. 10, the labels 300 may be formed in similar fashion to the labels 100, 200. Multiple-up leaflets 380A and 380B are provided including individual leaflet portions 382A and 382B and waste portions 384. In this case, the leaflets 380A, 380B are applied to the web 14 in seriatim such that the end edge 372A (which corresponds to the end 372 of the tab member 370) of an extended flap 386A of the leaflet 380A is spaced from the end fold 366B (which corresponds to the fold 366 of the label 300) of the leaflet 380B by the gap dimension G. After the laminate web is applied, the laminate web and leaflets are cut to form the labels 300. The cutting step includes cutting along the lines C—C as shown in FIG. 10.

Figure 11:
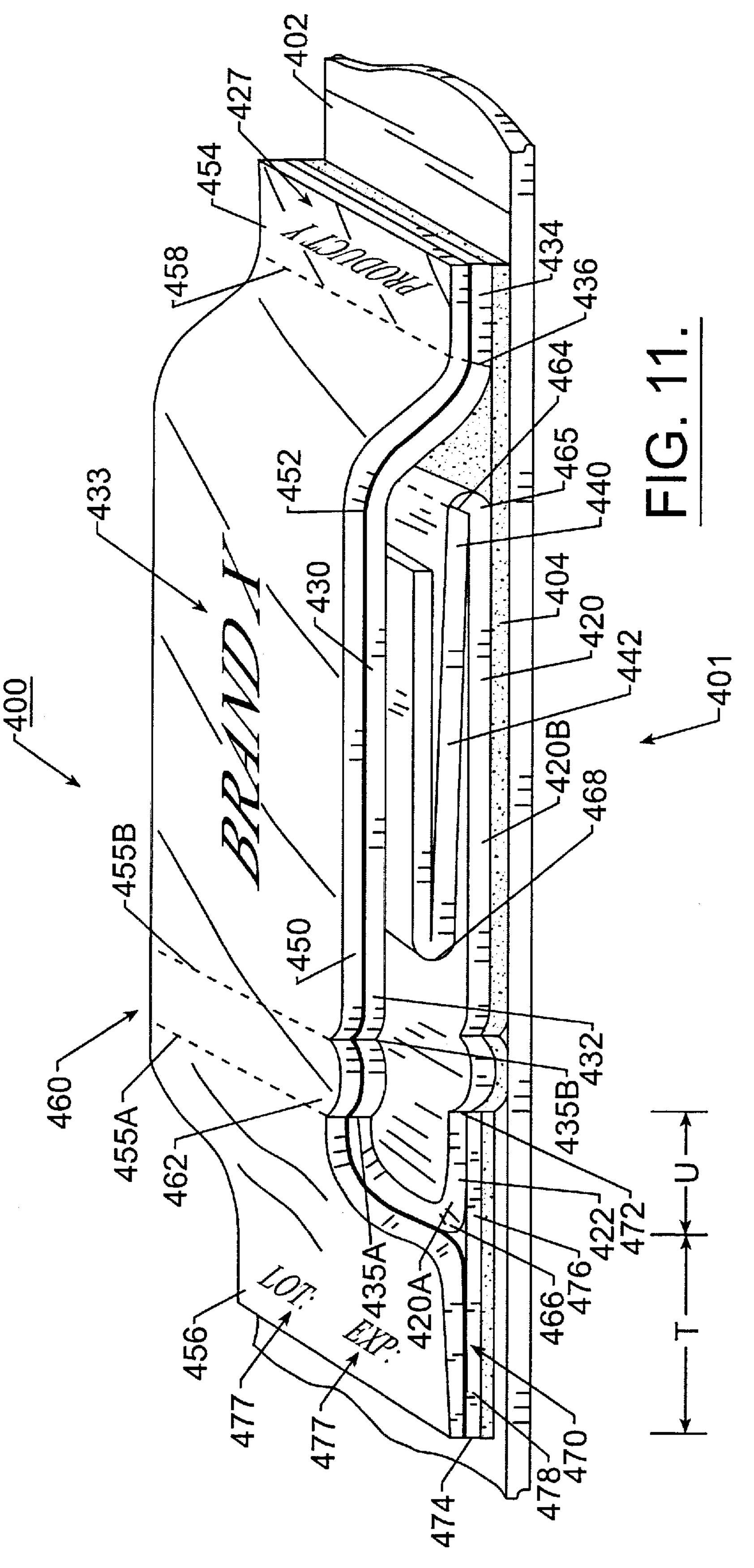
FIG. 11 is a perspective view of a label according to a fourth embodiment disposed on a release liner.
Figure 12:
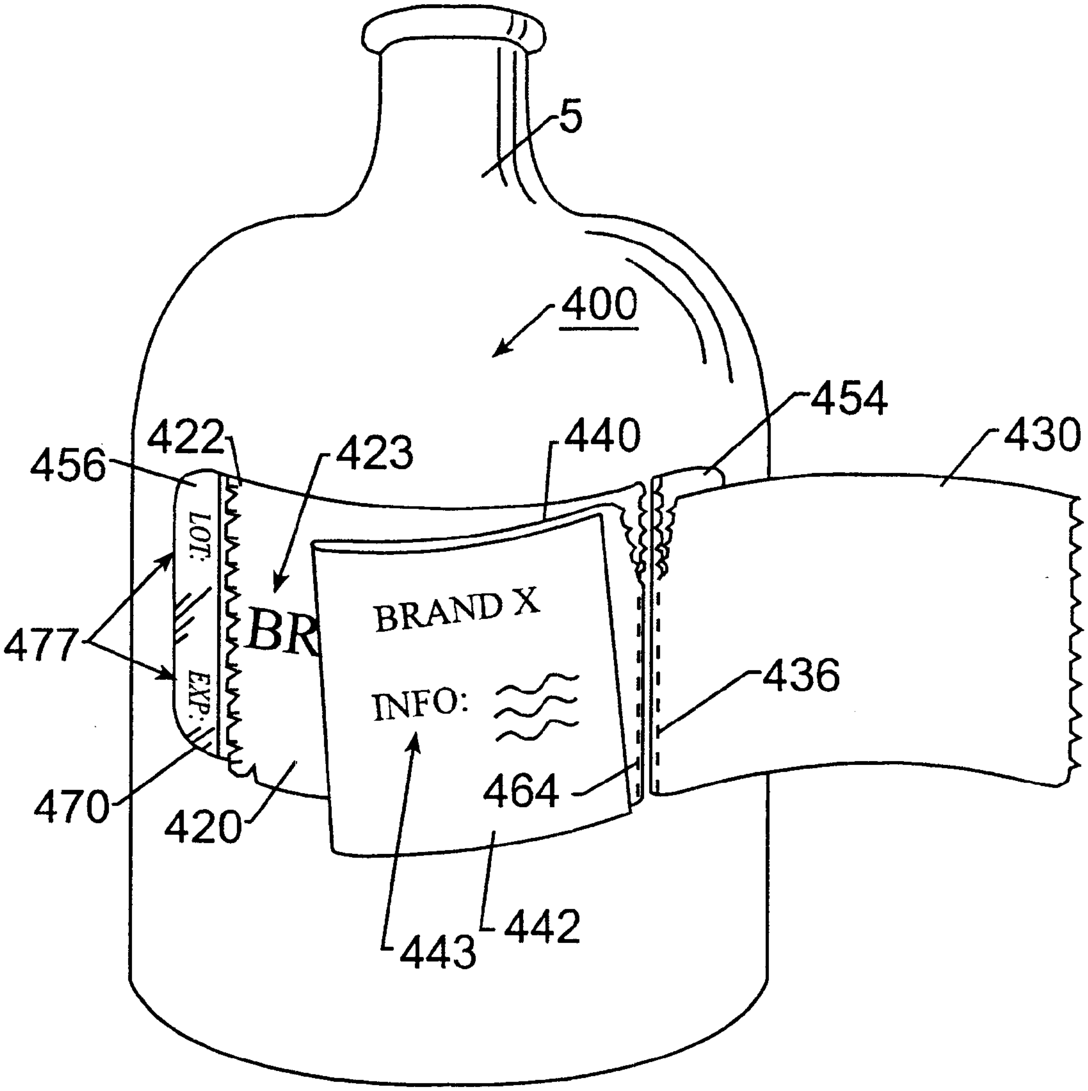
FIG. 12 is a perspective view of the label of FIG. 11 secured to a container, the top panel, a portion of the laminate cover, and the first interior panel each being partially removed.

With reference to FIGS. 11 and 12, a label according to a fourth embodiment, generally denoted by the numeral 400 is shown therein. The label 400 includes a leaflet 401 and an overlying laminate cover 450. The label 400 is releasably secured to a release liner 402 by a pressure-sensitive adhesive layer 404. Elements 422, 423, 433, 435A, 435B, 442, 443, 450, 452, 454, 455A, 455B, 456, 460, 462, and 466 of the label 400 correspond to elements 122, 123, 133, 135A, 135B, 142, 143, 150, 152, 154, 155A, 155B, 156, 160, 162, and 166, respectively. The label 400 differs from the label 100 as follows.

A bottom panel 420 is joined to a first interior panel 440 along a fold 465. A tear line 464 is formed along a fold 465 or, alternatively, in a first interior panel 440 adjacent the fold 465. The top panel 430 includes a marginal extended flap 434 which extends outwardly beyond the fold 465 and is coated on its under surface with the adhesive 404. A tear line 436 is formed in the top panel 430 adjacent the fold 465. A tear line 458 is formed in the laminate cover 450 and overlies the tear line 436. Indicia 427 is disposed on the upper surface of the marginal extended flap 434. Marginal portions 422, 432 are defined between the fold 466 and the adjacent edge 468 of the interior panel 440.

A tab member 470 is positioned beneath the laminate cover 450 and opposite the extended flap 434. The tab member 470 includes elements 472, 474, 476, 477 and 478 corresponding to elements 172, 174, 176, 177 and 178 of the label 100. The tab member portion 476 underlies a portion 420A of the bottom panel 420 and a remaining portion 420B of the bottom panel directly engages the adhesive 404. As discussed above with regard to the label 100, the relative sizes of the bottom panel portions and the extent of the underlap may differ from that shown; however, the portion 420B is preferably greater than the portion 420A. Preferably, the tab member 470 has dimensions U and T (see FIG. 11)

the same as those discussed above with regard to dimensions U and T of the label 100.

With reference to FIG. 12, the label 400 is shown therein secured to a suitable container 5. As shown in the figure, the tear strip 460 has been removed as discussed above with respect to the label 100. The top panel 430 (as well as the overlying portion of the laminate cover 450) and the first interior panel 440 are shown partially removed. It will be appreciated that the end user is presented with the options of removing the top panel 430 by tearing along the tear line 436 and the tear line 458, removing the interior panels 440 and 442 by tearing along the tear line 464, or both.

It will be appreciated that the label 400 provides the same advantages as the label 100. Namely, the tab member 470 provides a location for indicia 477 which is secure from removal, in contrast to the laminate portion 454, the extended flap 434, and the indicia 427 thereon. Additionally, the label 400 provides a similar resistance to adhesive ooze and an increased opaque, printable area.

Figure 13:
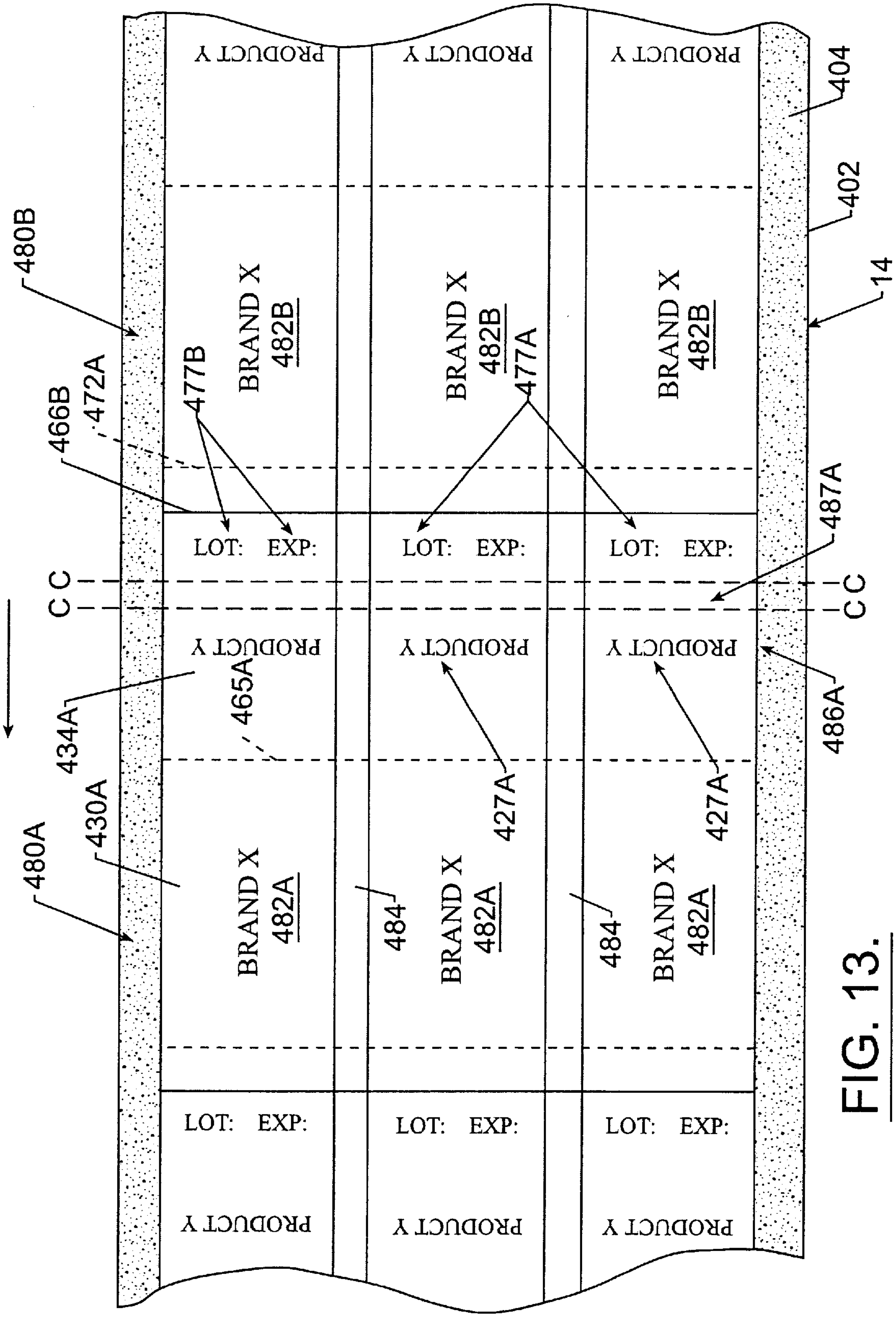
FIG. 13 is a fragmentary, top plan view of the release liner and multiple-up leaflets used to form labels as shown in FIG. 11.

The labels 400 may be formed using a method and apparatus similar to those described above with regard to the label 100. With reference to FIG. 13, multiple-up leaflets 480A and 480B are provided including individual leaflet portions 482A, 482B and waste strips 484. The leaflet 480A has elements or portions 427A, 430A, 434A and 465A corresponding to elements 427, 430, 434, and 465 of a first row of labels 400. The leaflet 480A also has elements 472A and 477A corresponding to elements 472 and 477 of the next downstream row of labels 400. The leaflet 480B includes a fold 466B corresponding to the fold 466 of the second row of labels 400 to be formed.

The leaflets 480A, 480B are laid on the web in the same manner as the leaflets 180A, 180B except that the extended flap 486A forms a part of the top panel of the leaflet 480A rather than a part of the bottom panel. The extended flap 486A and the laminate web (not shown) are cut along the lines C—C as shown in FIG. 13. The leaflets 480A, 480B and the laminate web are also cut as described above to form the label 400 and waste portions 484 and 487A which are thereafter removed.

The labels 400 may be formed using the same materials as discussed above with respect to the labels 100. Suitable modifications to the above described apparatus and method for making the labels 100 in order to form the labels 400 will be apparent to those of ordinary skill in the art.

Figure 14:
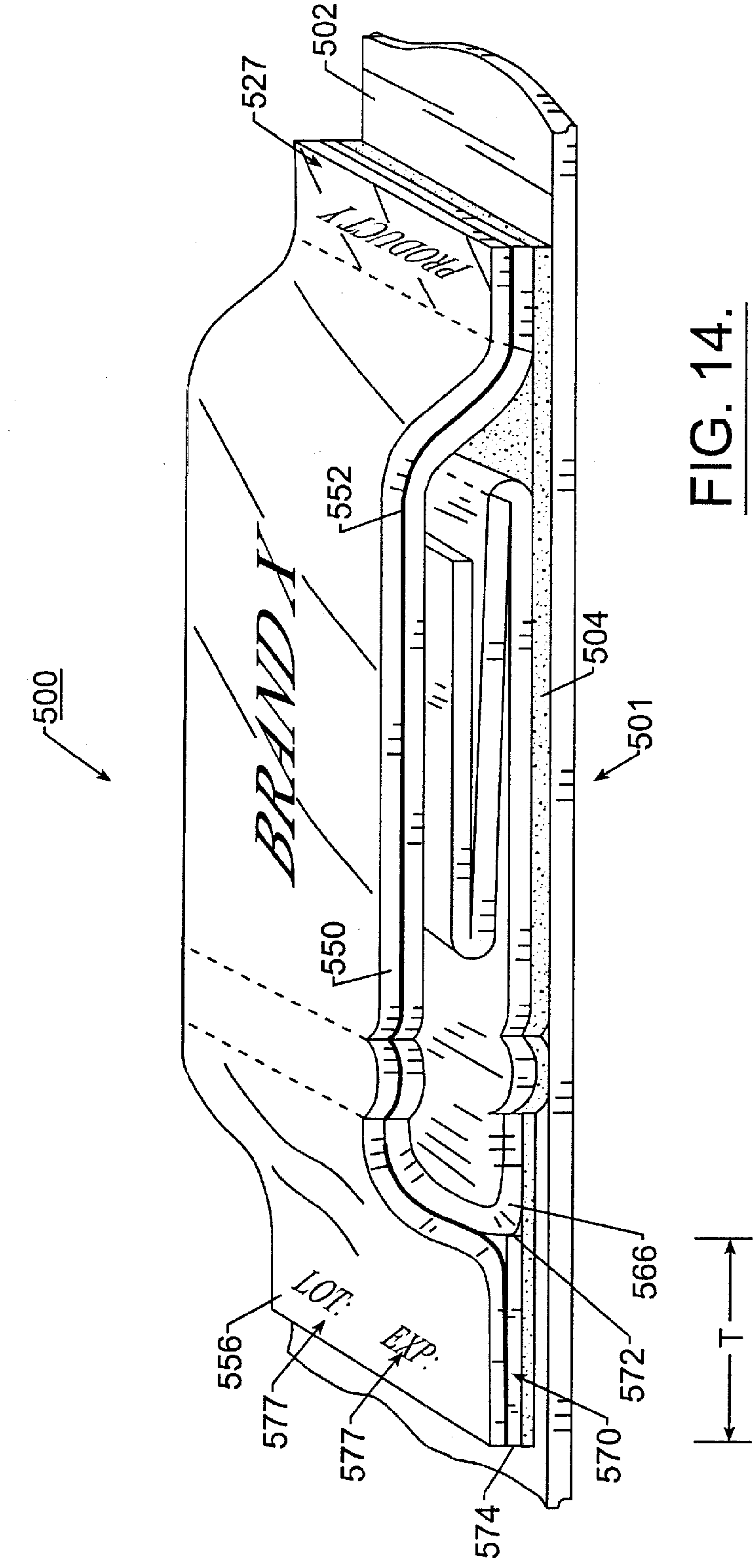
FIG. 14 is a perspective view of a label according to a fifth embodiment disposed on a release liner.

With reference to FIG. 14, a label 500 according to a fifth embodiment of the present invention is shown therein. The label 500 is releasably adhered to a release liner 502 by a pressure-sensitive adhesive layer 504 and includes a leaflet 501 which is identical to the leaflet 401. A laminate cover 550 corresponding to the laminate cover 450 is secured to the leaflet and a tab member 570 by means of a laminate adhesive 552. The tab member 570 has indicia 577 printed on the upper surface thereof. The label 500 differs from the label 400 in that the entirety of the tab member 570 (extending between opposed ends 572 and 574) extends outwardly beyond the leaflet 501. The end 572 of the tab member 570 is positioned substantially flush with the end fold 566 of the leaflet 501. The tab member 570 is covered by a laminate cover portion 556. The length T of the tab member 570 is preferably the same as discussed above with regard to the length T of the tab member 470.

The labels 500 may be manufactured in substantially the same manner as described above for the manufacture of the labels 200. The method for forming the labels 500 differs only in that the multiple-up leaflets are configured and placed on the web such that the extended flaps thereof extend from the top panels instead of the bottom panels.

Figure 15:
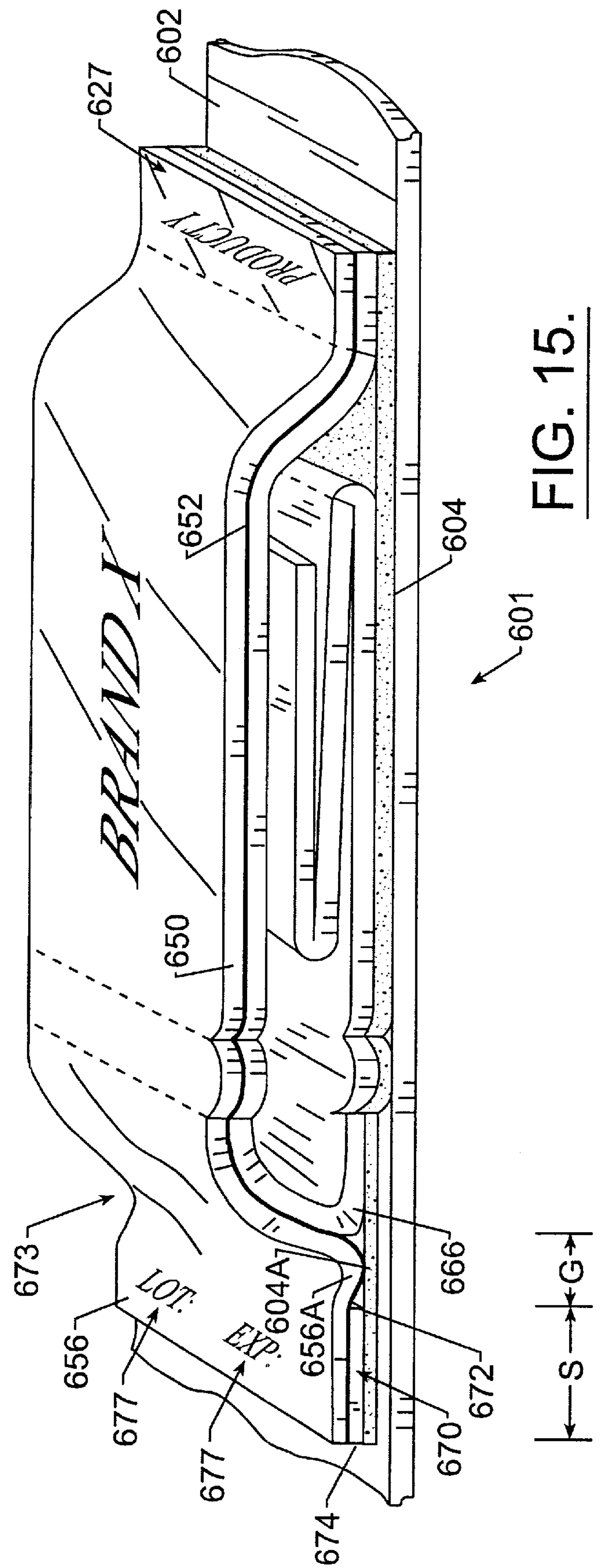
FIG. 15 is a perspective view of a label according to a sixth embodiment disposed on a release liner.

With reference to FIG. 15, a label 600 according to a sixth embodiment is shown therein. The label 600 is releasably adhered to a release liner 602 by a layer of pressure-sensitive adhesive 604. The label 600 includes a leaflet 601 identical to the leaflet 401 and a laminate cover 650 adhered to each of the leaflet 601, a tab member 670 and a portion of the adhesive 604 by a laminate adhesive 652. The tab member 670 is preferably formed of the same materials as described above with regard to the tab member 170. The tab member 670 has indicia 677 printed on the upper surface thereof. The label 600 differs from the label 400 in that a gap 673 is defined between the edge 672 of the tab member 670 and the end fold 666 of the leaflet 601. As a result, a portion 656A of the laminate cover portion 656 is directly adhered to a portion 604A of the adhesive 604.

Preferably, the gap G (see FIG. 14) extending between the end edge 672 and the fold 666 is at least ⅛ inch and, more preferably, between about ⅛ and ¼ inch. Preferably, the length S of the tab member 670 extending between the first edge 672 and the opposed edge 674 is at least ⅜ inch, and more preferably, between about ⅜ and ¾ inch.

The labels 600 may be manufactured in substantially the same manner as described above for the manufacture of the labels 300. The method for forming the labels 600 differs only in that the multiple-up leaflets are configured and placed on the web such that the extended flaps thereof extend from the top panels instead of the bottom panels.

While, in the foregoing methods for forming the labels 100, 200, 300, 400, 500, 600, the tab members are severed from the extended flaps by a pair of cut lines formed through the extended flap transverse to the web length, it is also contemplated that a single cut line may be formed in the extended flap of the leaflet. However, the provision of a waste portion (defined between the cut lines C—C) is desirable to increase the margin of error for cutting the extended flap and to provide a desired spacing between the labels on the release liner.

While the labels of the present invention incorporating tab members have been described and shown incorporating leaflets of certain preferred designs, it is contemplated and will be appreciated that various other leaflet designs may be employed. For example, the extended flaps from which the tab members are severed may form a part of and extend from an interior panel rather than one of the top and bottom panels as described above. In this case the extended flap of the formed label would extend from an interior panel as well. Additionally, the laminate covers and the leaflets may be provided with different configurations of tear lines than those described herein. The laminate covers may be provided with only a single or no tear lines and may be releasably secured at one or both ends.

Labels (not shown) according to the present invention may be formed using labels which have only a single panel or sheet. The label may be formed substantially the same as any of the aforedescribed labels with the sheet corresponding to the bottom panel 120, 220, 320, 420, 520, 620, the top and interior panels being omitted. The term "leaflet" as used in the claims which follow is defined broadly and includes leaflets formed of a single, unfolded panel or sheet. If desired, a portion or portions of the laminate cover may be removable and suitable tear lines may be provided.

Figure 16:
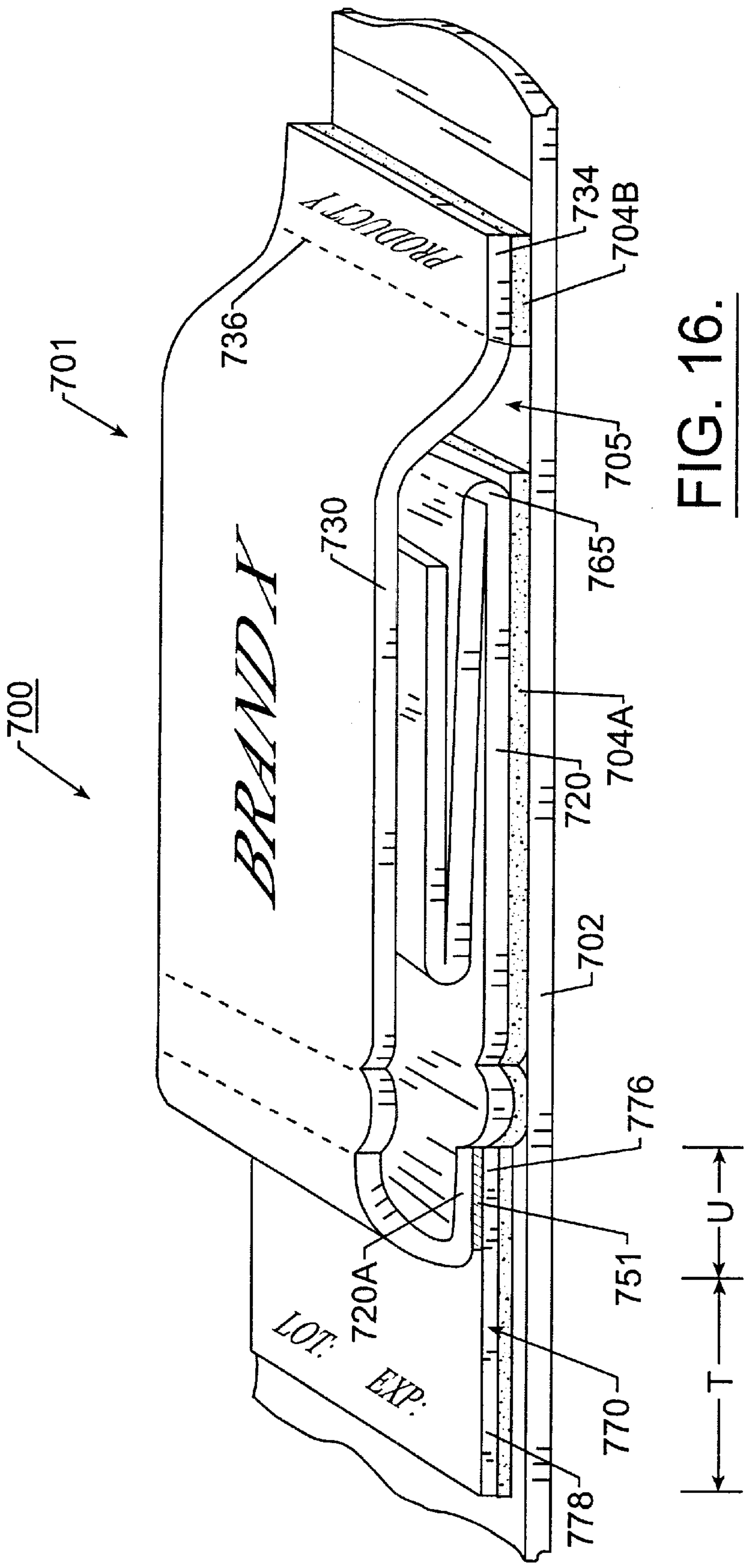
FIG. 16 is a perspective view of a label according to a seventh embodiment disposed on a release liner.

With reference to FIG. 16, a label 700 according to a seventh embodiment is shown therein disposed on a release liner 702. The label 700 includes a leaflet 701 corresponding to the leaflet 401 and a tab member 770 corresponding to the tab member 470, the tab member 770 having an exposed portion 778 and an underlapping portion 776. The label 700 is similar to the label 400 except that no laminate cover is provided corresponding to the laminate cover 450, the tab member 770 is secured to the leaflet 701 by an adhesive layer 751, and an adhesivefree gap 705 is provided adjacent the removal tear line 736.

The adhesive 751 is interposed between and directly adheres the upper surface of the underlapping portion 776 of the tab member 770 and the overlying portion 720A of leaflet bottom panel 720. Preferably, the adhesive 751 is a pressure-sensitive adhesive operative to substantially permanently secure the portions 776, 720A together. Suitable adhesives include S3727 available from H. B. Fuller of Minneapolis, Minn. Preferably, the label 700 has dimensions T, U substantially the same as those described above with regard to the label 400. The label 700 will provide the same benefits as discussed with regard to the foregoing embodiments with the exception of the benefits attributable to the laminate covers.

With the exception of the portion 720A, the bottom panel 720 is releasably adhered to the release liner 702 by a discrete adhesive patch 704A and the extended flap is releasably adhered to the release liner by a second discrete adhesive patch 734. The adhesive-free gap 705 is defined between the opposing edges of adhesive patches 704A and 704B, which are preferably located adjacent, and more preferably immediately below (as shown), the fold 765 and the removal tear line 736, respectively. The gap 705 serves to prevent adherence of the top panel 730 to the article, which adherence might otherwise interfere with opening of the leaflet 701 and removal of the top panel 730.

The labels 700 may be formed by the method and apparatus described above with regard to the labels 400, except as follows. Rather than providing a continuous coating of adhesive on the release liner, adhesive patches are applied to the release liner with gaps corresponding to the gaps 705 therebetween. Preferably, the adhesive is applied as discrete, spaced apart patches, the spaces between respective patches corresponding to the gaps 705. The leaflets are placed on the adhesive patches such that they span the gaps. Prior to placing each leaflet in overlapping relation with the preceding leaflet, a strip of adhesive corresponding to the adhesive 751 is applied to the upper surface of the leaflet portion corresponding to the portion 776 of the preceding leaflet and/or the bottom panel lower surface 720A of the succeeding leaflet. Appropriate placement of the leaflets and the adhesives will be readily apparent to those of ordinary skill in the art upon a reading of the description herein.

A label (not shown) similar to the label 700 and also not having a laminate cover may be formed using a leaflet corresponding to the leaflet 101, a tab member corresponding to the tab member 770 and an adhesive strip corresponding to the adhesive strip 751. The construction and methods for forming such a label will be apparent to those of ordinary skill in the art upon a reading of the description herein.

The adhesive free gap 705 may be omitted from the label 700 or may be incorporated into any of the labels 400, 500, 600. Moreover, the label 700 and the method for forming the same may be modified to include any of the alternatives and variations as described above. For example, the web used to form the labels 700 may be any of the various webs 14 described above.

As discussed above, it is contemplated that labels similar to labels 400, 500, 600 may be formed using a self-adhesive face stock web so that the labels include a base portion and a second layer of adhesive interposed between the leaflet and tab member and the release liner. It is further contemplated that any of these labels may be provided with an adhesive-free gap on the upper surface of the base portion corresponding to the adhesive free gap 705. Such adhesive-free gaps may be formed by applying adhesive patches as described above.

The leaflets 101, 201, 301, 401, 501, 601, 701 may be formed and printed in any suitable manner, such methods and apparatus being known to those of ordinary skill in the art. In particular, both the upper and lower surfaces of each panel may be printed on, including the lower (ultimately adhesive coated) surfaces of the bottom panels. Preferably the adhesive layers are clear adhesives so that any indicia disposed on the lower surface of a bottom panel may be viewed through the substrate, for example, the clear glass or plastic of the container to which the label is affixed.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method for forming self-adhesive labels using a web, first and second unitary leaflets, each of the leaflets including a bottom panel and an extended flap, and an adhesive layer, comprising the steps of:

a) placing the leaflets onto web in successive relation such that the leaflets are secured to the web by the adhesive layer;

b) applying a laminate web and a laminate adhesive over the leaflets and the web such that the laminate web is secured to the leaflets by the laminate adhesive; and c) cutting the laminate web and the leaflets to form the labels, said cutting step including cutting through the laminate web to form a laminate cover overlying each label and cutting through the extended flap of the first leaflet such that a first portion of the extended flap thereof remains with the first leaflet and forms a part of a first label and a second portion of the first leaflet extended flap is severed from the first leaflet extended flap and forms a tab member forming a part of a second, adjacent label, at least an exposed portion of the tab member disposed alongside the second leaflet.

2. The method of claim 1 wherein said step of placing the leaflets includes placing the leaflets in imbricated relation such that an underlap portion of the extended flap of the first leaflet is interposed between a first portion of the bottom panel of the second leaflet and the adhesive layer, and said step of cutting includes cutting the first leaflet extended flap at a location spaced apart from the bottom panel of the second leaflet, whereby the tab member forming a part of the second label includes an underlap portion interposed between the bottom panel thereof and the adhesive layer, the second leaflet including a second bottom panel portion engaging the adhesive layer and not overlying the tab member.

3. The method of claim 1 wherein said step of placing the leaflets includes placing the leaflets such that an end edge of the extended flap of the first leaflet is disposed substantially immediately adjacent an end edge of the second leaflet.

4. The method of claim 1 wherein said step of placing the leaflets includes placing the leaflets such that an end edge of the extended flap of the first leaflet is spaced apart from an adjacent end edge of the second leaflet, the end edges defining a gap therebetween, and wherein a gap portion of the laminate cover overlies the gap.

5. The method of claim 1 including the step of printing indicia on a tab portion of the laminate cover overlying the exposed portion of the tab member.

6. The method of claim 1 including a step of forming an access tear line in the laminate cover of the first label adjacent the tab member thereof.

7. The method of claim 6 further including a step of forming a removal tear line in the laminate cover of the first label adjacent the extended flap of the first label.

8. The method of claim 1 wherein the first and second leaflets are formed from multiple up leaflets.

9. The method of claim 1 wherein said cutting step includes forming at least two cut lines through the laminate web and the extended flap of the first leaflet, the cut lines defining a waste portion therebetween, and said method further including the step removing the waste portion.

10. The method of claim 1 wherein each of the leaflets includes a top panel connected to its respective bottom panel.

11. The method of claim 1 wherein the web is a release liner.

12. The method of claim 1 including the step of applying adhesive to the release liner to form the adhesive layer such that adhesive-free gaps are defined therein, wherein the leaflets are placed onto the release liner such that the leaflets overlie the adhesive-free gaps.

13. A method for forming self-adhesive labels using a web, first and second unitary leaflets, each of the leaflets including a bottom panel and an extended flap, and a base adhesive layer, comprising the steps of:

a) placing the leaflets onto the web in successive, imbricated relation such that an underlap portion of the extended flap of the first leaflet is interposed between a first portion of the bottom panel of the second leaflet and the base adhesive layer, whereby the leaflets are secured to the web by the base adhesive layer; and b) cutting the leaflets to form the labels, said cutting step including cutting through the first leaflet extended flap at a location spaced apart from the bottom panel of the second leaflet such that a first portion of the first leaflet extended flap remains with the first leaflet and forms a part of a first label and a second portion of the first leaflet extended flap is severed from the first leaflet and forms a tab member forming a part of a second, adjacent label, at least an exposed portion of the tab member disposed alongside the second leaflet.

14. The method of claim 13 including the step of applying a securing adhesive to at least one of the leaflets such that the underlap portion of the first leaflet extended flap is secured to the first portion of the bottom panel of the second leaflet by the securing adhesive.

15. The method of claim 13 including the step of printing indicia the exposed portion of the tab member.

16. The method of claim 13 including a step of forming a tear line in the leaflet of the first label adjacent the tab member thereof.

17. The method of claim 16 further including a step of forming a second tear line in the leaflet of the first label adjacent the extended flap of the first label.

18. The method of claim 13 wherein each of the leaflets includes a top panel connected to its respective bottom panel.

19. The method of claim 13 wherein the web is a release liner.

20. The method of claim 13 including the step of applying adhesive to the web to form the base adhesive layer such that adhesive-free gaps are defined therein, wherein the leaflets are placed onto the web such that the leaflets overlie the adhesive-free gaps.

* * * * *